US012607922B2

(12) United States Patent
Byon et al.

(10) Patent No.: US 12,607,922 B2
(45) Date of Patent: Apr. 21, 2026

(54) CAMERA MODULE AND ELECTRONIC DEVICE COMPRISING SAME

(71) Applicant: Samsung Electronics Co., Ltd., Suwon-si (KR)

(72) Inventors: Kwangseok Byon, Suwon-si (KR); Kihuk Lee, Suwon-si (KR); Min Heu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 314 days.

(21) Appl. No.: 18/545,537

(22) Filed: Dec. 19, 2023

(65) Prior Publication Data

US 2024/0129610 A1 Apr. 18, 2024

Related U.S. Application Data

(63) Continuation of application No. PCT/KR2022/008863, filed on Jun. 22, 2022.

(30) Foreign Application Priority Data

Jun. 22, 2021 (KR) ........................ 10-2021-0081009

(51) Int. Cl.
*G03B 30/00* (2021.01)
*G03B 5/08* (2021.01)
(Continued)

(52) U.S. Cl.
CPC .............. *G03B 30/00* (2021.01); *G03B 5/08* (2013.01); *G03B 17/04* (2013.01); *H04N 23/55* (2023.01);
(Continued)

(58) Field of Classification Search
None
See application file for complete search history.

(56) References Cited

U.S. PATENT DOCUMENTS 10,725,288 B1 7/2020 Topliss et al.
11,032,472 B2 6/2021 Hu et al.
(Continued)

FOREIGN PATENT DOCUMENTS

CN 111812910 A 10/2020
EP 3822588 5/2021
(Continued)

OTHER PUBLICATIONS

Extended European Search Report dated Aug. 14, 2024 issued in European Patent Application No. 22828745.4.
(Continued)

*Primary Examiner* — Phu Vu
(74) *Attorney, Agent, or Firm* — Nixon & Vanderhye, P.C.

(57) ABSTRACT

According to various embodiments, a camera module and/or an electronic device comprising same may comprise: a first guide unit comprising a first magnet having the shape of an arc around a first axis of rotation; a first rotating unit comprising a rotation base disposed on the first guide unit and configured to rotate around the first axis of rotation; a support bearing disposed between the first guide unit and the first rotating unit and configured to rotatably support the first rotating unit with regard to the first guide unit; a first coil disposed on the first rotating unit and configured to generate an electromagnetic force together with the first magnet in response to an electric signal applied thereto, thereby providing a driving force for rotating the first rotating unit; a fixed magnet disposed on one of the first guide unit and the first rotating unit; and a first yoke disposed on an other of the first guide unit and the first rotating unit. The first rotating unit may be configured to rotate while remaining forced against the support bearing by a magnetic force generated between the fixed magnet and the first yoke. The first coil
(Continued)

may be configured to move along an arc trajectory on the first magnet as the first rotating unit rotates.

15 Claims, 16 Drawing Sheets

(51) Int. Cl.

| | |
|---|---|
| *G03B 17/04* | (2021.01) |
| *H04N 23/55* | (2023.01) |
| *H04N 23/57* | (2023.01) |

(52) U.S. Cl.
CPC ..... *H04N 23/57* (2023.01); *G03B 2205/0069* (2013.01)

(56) References Cited

U.S. PATENT DOCUMENTS

| | | | |
|---|---|---|---|
| 2005/0105076 A1 | 5/2005 | Jung et al. | |
| 2005/0128292 A1 | 6/2005 | Miyamaki et al. | |
| 2008/0025159 A1 | 1/2008 | Takayama et al. | |
| 2012/0155843 A1 | 6/2012 | Takizawa | |
| 2016/0266400 A1 | 9/2016 | Chan et al. | |
| 2017/0371230 A1 | 12/2017 | Ko et al. | |
| 2018/0120674 A1 | 5/2018 | Avivi et al. | |
| 2018/0224665 A1 | 8/2018 | Im et al. | |
| 2018/0267294 A1 | 9/2018 | Aschwanden et al. | |
| 2019/0129197 A1 | 5/2019 | Kim et al. | |
| 2020/0174270 A1 | 6/2020 | Enta et al. | |
| 2020/0244854 A1 | 7/2020 | Lee et al. | |
| 2020/0341290 A1 | 10/2020 | Chan et al. | |
| 2020/0355911 A1 | 11/2020 | Topliss et al. | |
| 2021/0136261 A1 | 5/2021 | Lee | |
| 2022/0279093 A1* | 9/2022 | Kwon ..................... H04N 23/54 | |
| 2023/0185053 A1* | 6/2023 | Kim ..................... G02B 7/1821 | |
| | | | 359/555 |
| 2023/0251502 A1* | 8/2023 | Kwon ..................... G02B 7/18 | |
| | | | 359/555 |

FOREIGN PATENT DOCUMENTS

| | | | |
|---|---|---|---|
| JP | 2018205683 A | 12/2018 | |
| KR | 20050051575 A | 6/2005 | |
| KR | 20140058450 A | 5/2014 | |
| KR | 20170096997 A | 8/2017 | |
| KR | 101942743 B1 | 1/2019 | |
| KR | 20190017113 A | 2/2019 | |
| KR | 20190119832 A | 10/2019 | |
| KR | 20200013020 A | 2/2020 | |
| KR | 20210129455 A | 10/2021 | |
| WO | 2011/155178 | 12/2011 | |
| WO | 2019198956 A1 | 10/2019 | |

OTHER PUBLICATIONS

International Search Report for PCT/KR2022/008863 mailed Sep. 30, 2022, 4 pages.
Written Opinion of the ISA for PCT/KR2022/008863 mailed Sep. 30, 2022, 3 pages.

* cited by examiner

CAMERA MODULE AND ELECTRONIC DEVICE COMPRISING SAME

CROSS-REFERENCE TO RELATED APPLICATIONS

This application is a continuation of International Application No. PCT/KR2022/008863 designating the United States, filed on Jun. 22, 2022, in the Korean intellectual Property Receiving Office and claiming priority to Korean Patent Application No. 10-2021-0081009, filed on Jun. 22, 2021, in the Korean Intellectual Property Office, the disclosures of each of which are incorporated by reference herein in their entireties.

BACKGROUND

Field

The disclosure relates to an electronic device, for example, a camera module and/or an electronic device including the camera module.

Description of Related Art

An electronic device may refer to a device that performs a specific function based on a loaded program, such as a consumer electronic device, an electronic notebook, a portable multimedia player, a mobile communication terminal, a tablet PC, a video/audio device, a desktop/laptop computer, or a car navigation system. For example, these electronic devices may output stored information as sound or a video. In recent years, as the integration level of electronic devices has increased and high-speed, large-capacity wireless communications have become more common, a single electronic device, such as a mobile communication terminal, may be equipped with multiple functions. For example, in addition to a communication function, an entertainment function such as games, a multimedia function such as music and video playback, a communication and security function for mobile banking, or a function such as schedule management and an electronic wallet has been integrated into one electronic device.

Along with the development of digital camera manufacturing technology, electronic devices with small, lightweight camera modules have been commercialized. The inclusion of camera modules in commonly carried electronic devices (e.g., mobile communication terminals) has made it easier for users to use various functions such as video calls or augmented reality, as well as to take photos and videos.

In recent years, electronic devices including a plurality of cameras have become popular. An electronic device may include a camera module including, for example, a wide-angle camera and a telephoto camera. The electronic device may use the wide-angle camera to obtain a wide-angle image by photographing a wide range of scenes around the electronic device, or a telephoto camera to obtain a telephoto image by photographing a scene corresponding to a relatively distant position from the electronic device. As such, miniaturized electronic devices such as smartphones, which include a plurality of camera modules or lens assemblies, are encroaching on the compact camera market and expected to replace high-performance cameras such as single-lens reflex cameras in the future.

In an electronic device including a plurality of camera modules, a folded camera may be useful to extend a range of adjustment of a focal length. For example, in the folded camera, an optical member such as a prism may be disposed to allow for freedom in the design or arrangement of directions in which lenses are arranged, regardless of a direction in which external light is incident. The increased design freedom for the arrangement directions of the lenses in the folded camera enables implementation of a miniaturized telephoto camera, which may be mounted in combination with a wide-angle camera in the electronic device. Although an electronic device including a typical wide-angle camera may take or obtain an image of a subject while tracking the subject based on image signal processing, it may have limitations in the resolution of a distant subject in the obtained image.

The use of the telephoto camera in combination with the wide-angle camera may increase the resolution of a distant subject in a captured image while still allowing for tracking or scanning of subjects. The folded camera may have an increased range of subject tracking or scanning by including a tilt mechanism in an optical member such as a prism. However, it may be difficult to find a space to allow for a tilting motion of a prism or a space to place a drive device that implements the tilting motion in a miniaturized electronic device.

SUMMARY

Embodiments of the disclosure may provide a camera module capable of tracking or scanning a subject through a mechanical rotational or tilting motion, and/or an electronic device including the camera module.

Embodiments of the disclosure may provide a camera module that is miniaturized, while implementing a mechanical rotational or tilting motion, and/or an electronic device including the camera module.

Embodiments of the disclosure may provide a camera module that may improve image quality through a function of tracking or scanning a subject, and/or an electronic device including the camera module.

According to various example embodiments of the disclosure, a camera module and/or an electronic device including the same includes: a first guide unit including a first magnet having an arc shape centered on a first rotation axis, a first rotating unit, including a rotating base, disposed on the first guide unit and configured to rotate around the first rotation axis, a support bearing disposed between the first guide unit and the first rotating unit and configured to rotatably support the first rotating unit with respect to the first guide unit, a first coil disposed on the first rotating unit and configured to provide a driving force to rotate the first rotating unit by receiving an electrical signal and generating an electromagnetic force together with the first magnet, a fixed magnet disposed on any one of the first guide unit and the first rotating unit, and a first yoke disposed on the other of the first guide unit and the first rotating unit. The first rotating unit is configured to rotate in close contact with the support bearing by a magnetic force generated between the fixed magnet and the first yoke, and the first coil is configured to, as the first rotating unit rotates, move along an arc trajectory on the first magnet.

According to various example embodiments of the disclosure, a camera module and/or an electronic device including the same includes: a first guide unit including a first magnet having an arc shape centered on a first rotation axis, a first rotating unit, including a rotating base, disposed on the first guide unit and configured to rotate around the first rotation axis, a first coil disposed on the first rotating unit and configured to provide a driving force to rotate the first rotating unit by receiving an electrical signal and generating an electromagnetic force together with the first magnet, a second rotating unit, including a rotating base, disposed on the first rotating unit and configured to rotate together with the first rotating unit around the first rotation axis and rotate around a second rotation axis intersecting the first rotation axis with respect to the first rotating unit, a second coil disposed on the first rotating unit at a specified spacing from the first coil, and a second magnet disposed on the second rotating unit and at least partially facing the second coil in a direction of the second rotation axis. The second coil is configured to provide a driving force to rotate the second rotating unit with respect to the first rotating unit by receiving an electrical signal and generating an electromagnetic force together with the second magnet, and the first coil is configured to, as the first rotating portion rotates, move along an arc trajectory within a range in which the first magnet is disposed.

According to various example embodiments of the disclosure, an electronic device includes: a first camera module including a camera, a second camera module including a camera according, and at least one processor, comprising processing circuitry. At least one processor, individually and/or collectively is configured to obtain a first image using the first camera module, and track a subject in the first image or scan a partial area in the first image using the second camera module, while obtaining the first image.

According to various example embodiments of the disclosure, in a camera module of a folded structure, an optical member (e.g., a prism) may rotate about a plurality of rotation axes to provide a function of tracking or scanning a subject. For example, a camera module and/or an electronic device according to various embodiments of the disclosure may improve the quality of a captured image by providing a mechanical or optical subject tracking or scanning function. In an embodiment, coil-magnet combinations provided as a drive device may facilitate miniaturization and control of the mechanical or optical subject tracking function or scanning motion by substantially eliminating deviations in an operating environment of the drive device regardless of a tilting position of the optical member.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
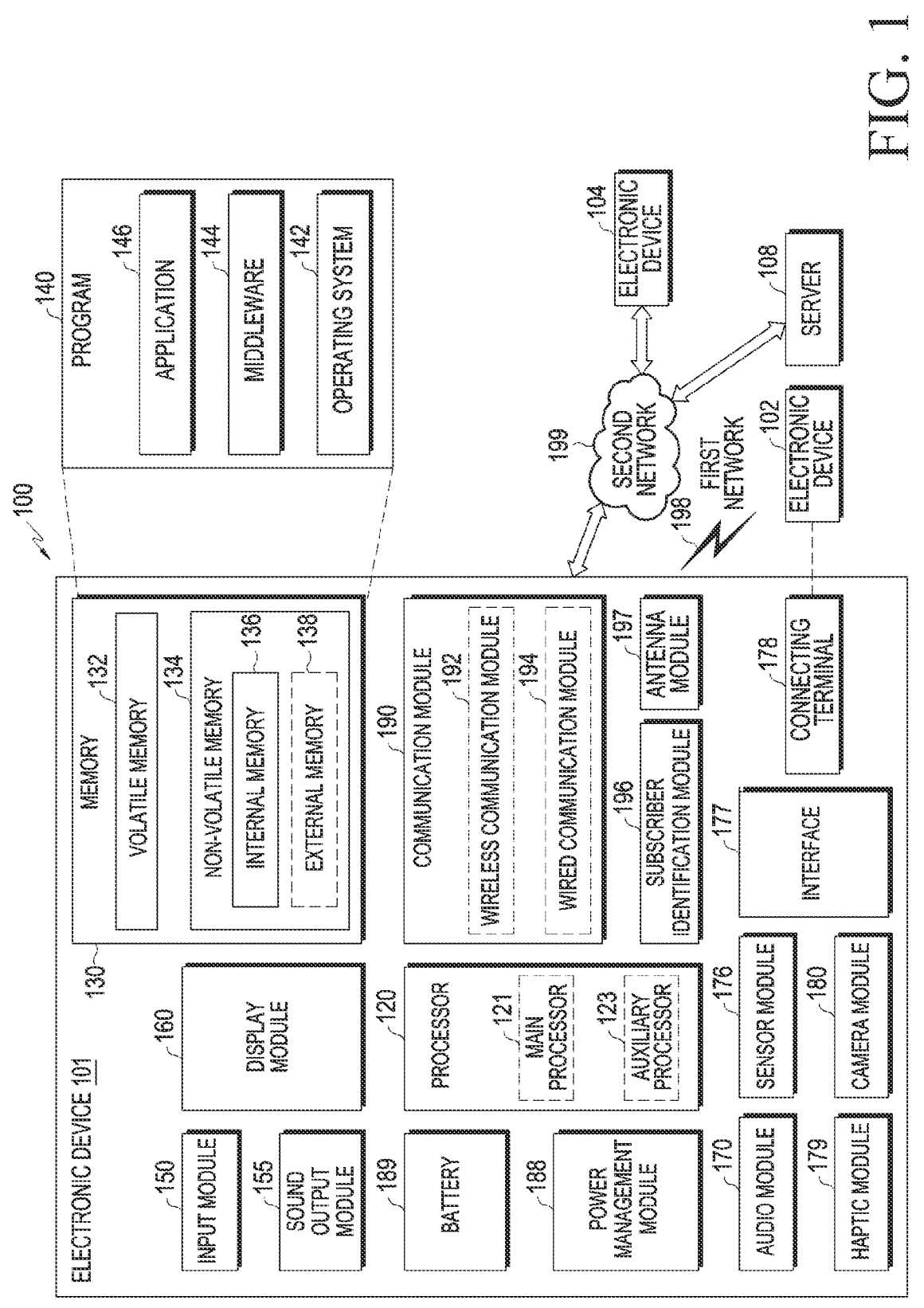
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one of the components (e.g., the connecting terminal 178) may be omitted from the electronic device 101, or one or more other components may be added in the electronic device 101. In an embodiment, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form an mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., an electronic device). For example, a processor (e.g., a processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the following detailed description, a length direction, a width direction, and/or a thickness direction of an electronic device may be referred to. The length direction may be defined as a 'Y-axis direction', the width direction may be defined as an 'X-axis direction', and/or the thickness direction may be defined as 'Z-axis direction'. Regarding a direction that a component faces, a 'negative sign/positive sign (−/+)' may be referred to together with the Cartesian coordinate system illustrated in the drawings. For example, a front surface of an electronic device or a housing may be defined as a 'surface facing a +Z direction', and a rear surface thereof may be defined as a 'surface facing a −Z direction'. In an embodiment, a side surface of the electronic device or the housing may include an area facing a +X direction, an area facing a +Y direction, an area facing a −X direction, and/or an area facing a −Y direction. In an embodiment, the 'X-axis direction' may refer, for example, to both the '−X direction' and the '+X direction'. This is based on the Cartesian coordinate system depicted in the drawings, for simplicity of description, and it is to be noted that the description of these directions or components does not limit various embodiments of the disclosure.

Figure 2:
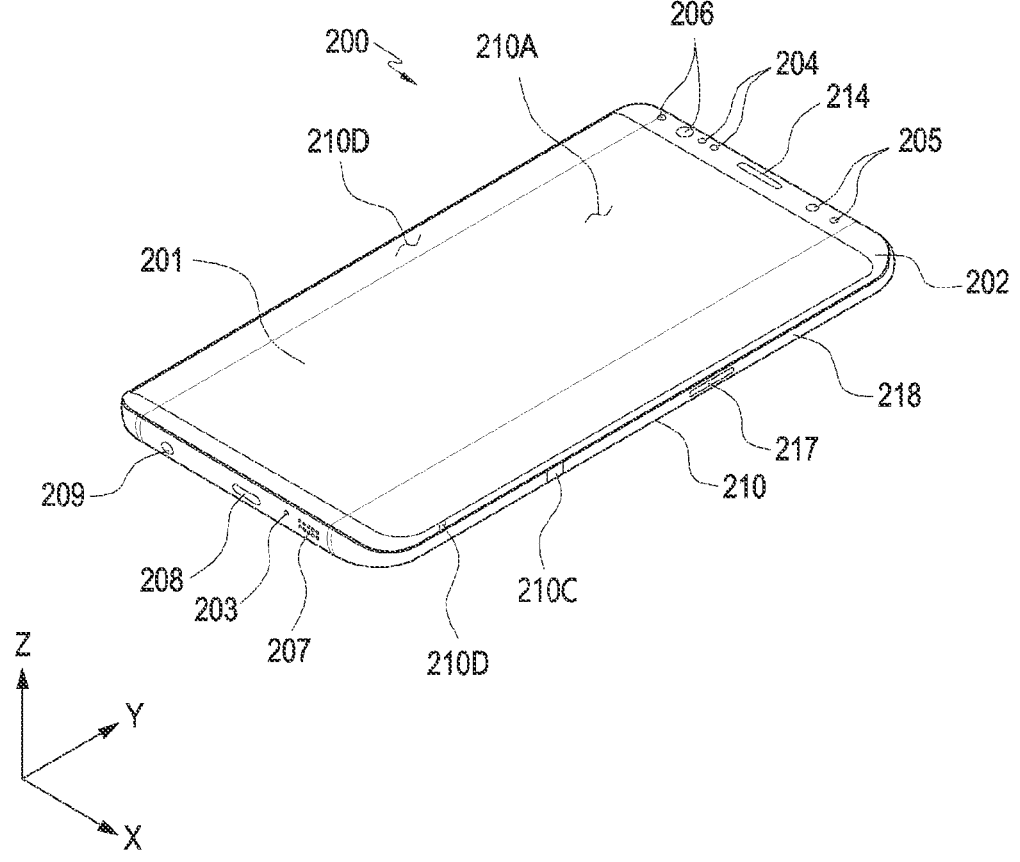
FIG. 2 is a front perspective view illustrating an electronic device according to various embodiments.
Figure 3:
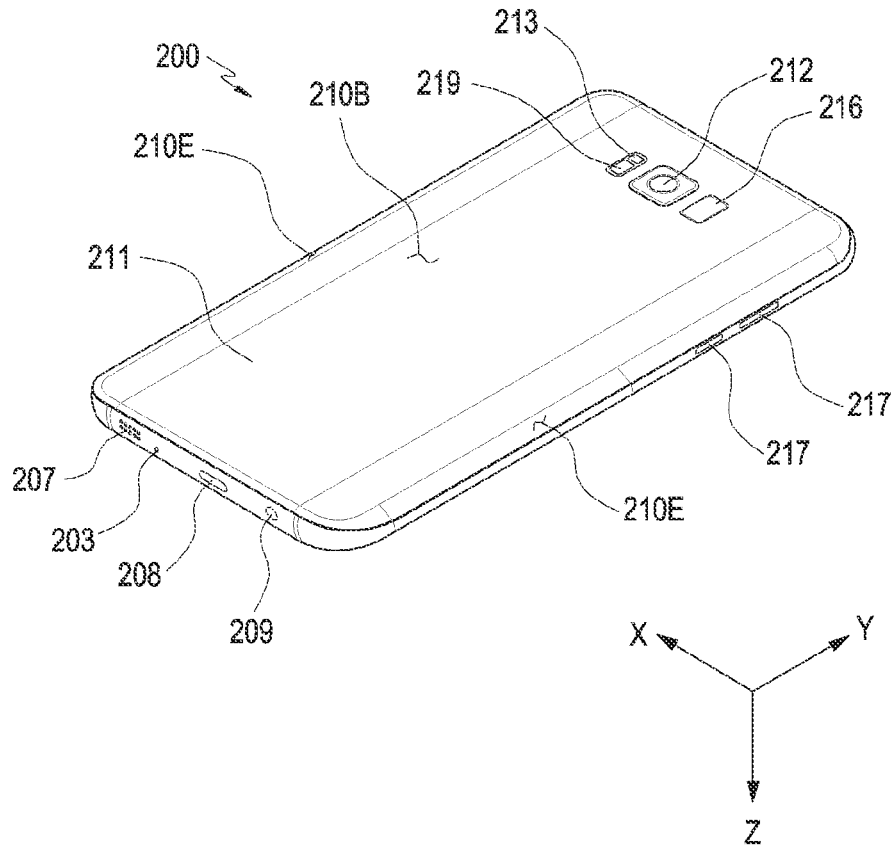
FIG. 3 is a rear perspective view illustrating the electronic device illustrated in FIG. 2 according to various embodiments.

FIG. 2 is a front perspective view illustrating a front surface of an electronic device 200 according to various embodiments. FIG. 3 is a rear perspective view illustrating a rear surface of the electronic device 200 according to various embodiments.

Referring to FIGS. 2 and 3, the electronic device 200 according to an embodiment may include a housing 210 which includes a first surface (or front surface) 210A, a second surface (or rear surface) 210B, and side surfaces 210C surrounding a space between the first surface 210A and the second surface 210B. In an embodiment (not shown), the housing may refer to a structure that forms a portion of the first surface 210A, the second surface 210B, and the side surfaces 210C of FIG. 2. According to an embodiment, at least a portion of the first surface 210A may be formed by a front plate 202 (e.g., a glass plate or polymer plate including various coating layers) which is at least partially substantially transparent. The second surface 210B may be formed by a rear plate 211 which is substantially opaque. The rear plate 211 may be formed of, for example, coated or tinted glass, ceramic, a polymer, a metal (e.g., aluminum, stainless steel (STS), or magnesium), or a combination of at least two of these materials. The side surfaces 220C may be coupled with the front plate 202 and the rear plate 211 and formed by a side structure (or "side structure") 218 including a metal and/or a polymer. In an embodiment, the rear plate 211 and the side structure 218 may be integrally formed and include the same material (e.g., a metal material such as aluminum).

In the illustrated embodiment, the front plate 202 may include two first areas 210D bent and extending seamlessly from the first surface 210A toward the rear plate 211 at both long edges of the front plate 202. In the illustrated embodiment (see FIG. 3), the second plate 202 may include two second areas 210E bent and extending seamlessly from the second surface 210B toward the front plate 202 at both long edges thereof. In an embodiment, the front plate 202 (or the rear plate 211) may include only one of the first areas 210D (or the second areas 210E). In an embodiment, some of the first areas 210D or the second areas 210E may not be included. In these embodiments, when viewed from the sides of the electronic device 200, the side structure 218 may have a first thickness (or width) on side surfaces without the first areas 210D or the second areas 210E, and a second thickness smaller than the first thickness (or width) on side surfaces with the first areas 210D or the second areas 210E.

According to an embodiment, the electronic device 200 may include at least one of a display 201, audio modules 203, 207, and 214, sensor modules 204, 216, and 219, camera modules 205, 212, and 213, key input devices 217, a light emitting element 206, or connector holes 208 and 209. In an embodiment, the electronic device 200 may not be provided with at least one (e.g., the key input devices 217 or the light emitting element 206) of the components or additionally include other components.

The display 201 may be visible, for example, through a substantial portion of the front plate 202. In an embodiment, at least a portion of the display 201 may be visible through the front plate 202 forming the first surface 210A or the first areas 210D of the side surfaces 210C. In an embodiment, corners of the display 201 may be formed substantially in the same shapes as those of adjacent peripheral portions of the front plate 202. In an embodiment (not shown), a gap between the periphery of the display 201 and the periphery of the front plate 202 may be substantially equal to increase the visible area of the display 201.

In an embodiment (not shown), a recess or an opening may be formed in a portion of a view area of the display 201, and at least one of the audio module 214, the sensor module 204, the camera module 205, or the light emitting element 206, which is aligned with the recess or the opening, may be included. In an embodiment (not shown), at least one of the audio module 214, the sensor module 204, the camera module 205, a fingerprint sensor 216, or the light emitting element 206 may be included on the rear surface of the view area of the display 201. In an embodiment (not shown), the display 201 may be incorporated with or disposed adjacent to a touch sensing circuit, a pressure sensor that measures the intensity (pressure) of a touch, and/or a digitizer that detects a magnetic field-based stylus pen. In an embodiment, at least some of the sensor modules 204 and 219 and/or at least some of the key input devices 217 may be disposed in the first areas 210D and/or the second areas 210E.

The audio modules 203, 207, and 214 may include a microphone hole 203 and speaker holes 207 and 214. A microphone for obtaining an external sound may be disposed in the microphone hole 203, and in an embodiment, a plurality of microphones may be disposed to detect the direction of sound. The speaker holes 207 and 214 may include an external speaker hole 207 and a receiver hole 214 for calls. In an embodiment, the speaker holes 207 and 214 and the microphone hole 203 may be implemented as a single hole, or a speaker (e.g., a piezo speaker) may be included without the speaker holes 207 and 214.

The sensor modules 204, 216, and 219 may generate an electrical signal or data value corresponding to an internal operating state of the electronic device 200 or an external environmental state. The sensor modules 204, 216, and 219 may include, for example, a first sensor module 204 (e.g., a proximity sensor) and/or a second sensor module (not shown) (e.g., a fingerprint sensor), disposed on the first surface 210A, and/or a third sensor module 219 (e.g., an HRM sensor) disposed on the second surface 210B of the housing 210, and/or a fourth sensor module (not shown) (e.g., a fingerprint sensor). The fingerprint sensor may be disposed on the second surface 210B as well as on the first surface 210A (e.g., the display 201). The electronic device 200 may further include at least one of, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The camera modules 205, 212, and 213 may include a first camera device 205 disposed on the first surface 210A of the electronic device 200, and a second camera device 212 and/or a flash 213 disposed on the second surface 210B of the electronic device 101. Each of the camera modules 205 and 212 may include one or more lenses, an image sensor, and/or an image signal processor. The flash 213 may include, for example, a light emitting diode (LED) or a xenon lamp. In an embodiment, one or more lenses (an IR camera, a wide-angle lens, and a telephoto lens) and image sensors may be arranged on one surface of the electronic device 200.

The key input devices 217 may be arranged on a side surface 210C of the housing 210. In an embodiment, the electronic device 200 may not include some or any of the above key input devices 217, and the key input devices 217 which are not included may be implemented in other forms such as soft keys on the display 201. In an embodiment, the key input devices may include the sensor module 216 disposed on the second surface 210B of the housing 210.

The light emitting element 206 may be disposed, for example, on the first surface 210A of the housing 210. The light emitting element 206 may provide, for example, state information about the electronic device 200 in the form of light. In an embodiment, the light emitting element 206 may provide, for example, a light source interworking with an operation of the camera module 205. The light emitting element 206 may include, for example, an LED, an IR LED, and a xenon lamp.

The connector holes 208 and 209 may include a first connector hole 208 that may accommodate a connector (e.g., a universal serial bus (USB) connector) for transmitting and receiving power and/or data to and from an external electronic device and a connector (e.g., an earphone jack) 209 for transmitting and receiving an audio signal to and from an external electronic device.

Figure 4:
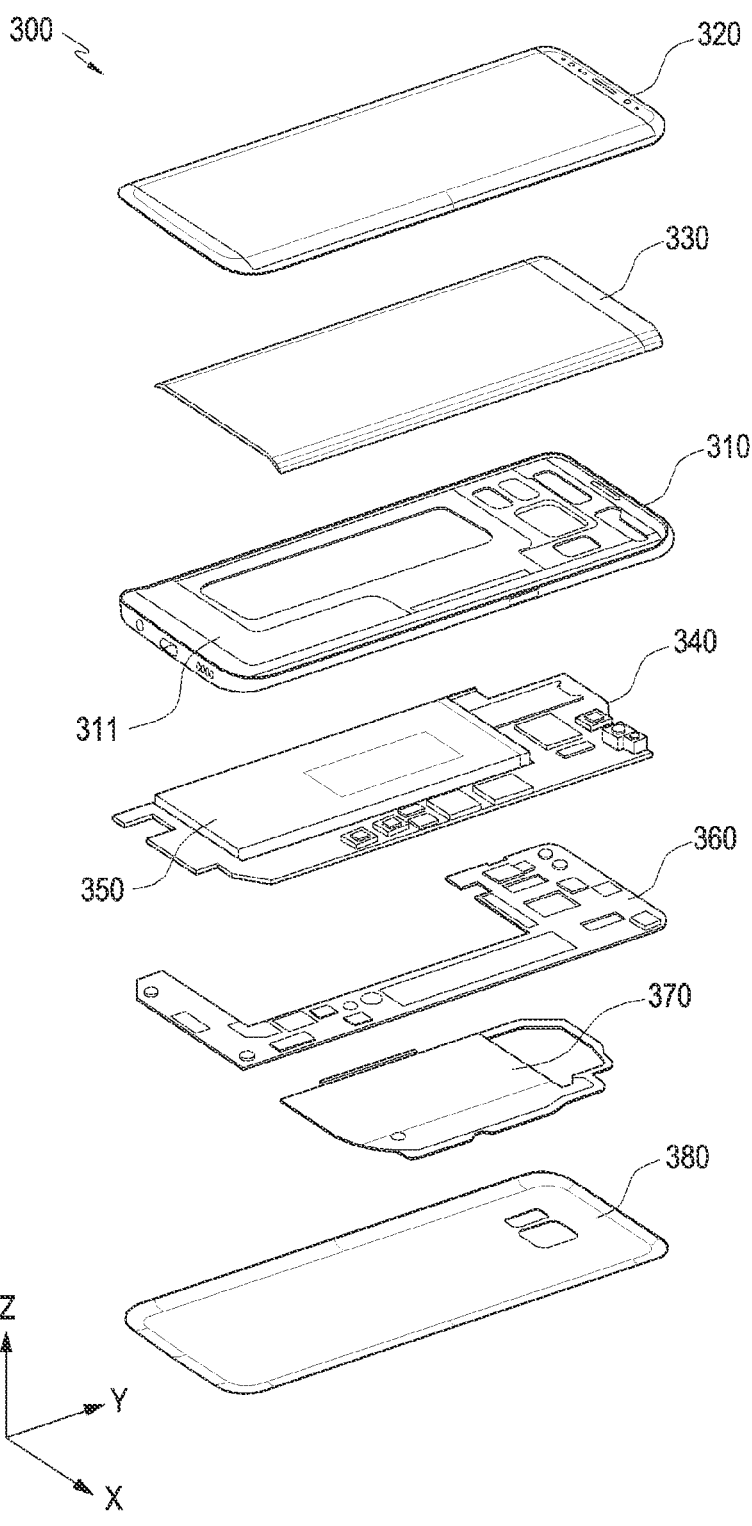
FIG. 4 is an exploded perspective view illustrating the electronic device illustrated in FIG. 2 according to various embodiments.

FIG. 4 is an exploded perspective view illustrating the electronic device 200 illustrated in FIG. 2 according to various embodiments.

Referring to FIG. 4, an electronic device 300 may include a side structure 310, a support member 311 (e.g., a bracket), a front plate 320, a display 330, a printed circuit board (PCB) 340, a battery 350, a second support member 360 (e.g., a rear case), an antenna 370, and a rear plate 380. In an embodiment, the electronic device 300 may not be provided with at least one (e.g., the first support member 311 or the second support member 360) of the components or may additionally include other components. At least one of the components of the electronic device 300 may be the same as or similar to at least one of the components of the electronic device 200 of FIG. 2 or 3, and a redundant description will be avoided below.

The support member 311 may be disposed inside the electronic device 300 and connected to the side structure 310 or may be integrally formed with the side structure 310. For example, the first support member 311 may be formed of a conductive material and/or a non-conductive material (e.g., polymer). The display 330 may be disposed on one surface of the first support member 311, and the PCB 340 may be disposed on the other surface thereof. A processor, memory, and/or an interface may be mounted on the PCB 340. The processor may include at least one of a CPU, an AP, a GPU, an image signal processor, a sensor hub processor, or a communication processor. Further, the processor may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

The memory may include, for example, volatile memory or non-volatile memory.

The interface may include, for example, a HDMI, a USB interface, an SD card interface, and/or an audio interface. The interface may, for example, electrically or physically connect the electronic device 300 to an external electronic device and include a USB connector, an SD card/multimedia card (MMC) connector, or an audio connector.

The battery 350 is a device supplying power to at least one component of the electronic device 300, and may include, for example, a non-rechargeable primary battery, a rechargeable secondary battery, or a fuel cell. At least a portion of the battery 350 may be disposed on substantially the same plane as, for example, the PCB 340. The battery 350 may be integrally disposed inside the electronic device 300 or detachably disposed in the electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may, for example, perform short-range communication with an external device or wirelessly transmit and receive power required for charging to and from an external device. In an embodiment, an antenna structure may be formed by a portion or a combination of the side structure 310 and/or the first support member 311.

In the following disclosure, reference may be made to the electronic devices 101, 102, 104, 200, and 300 in the foregoing embodiments. For components that are easily understandable from the foregoing embodiments, the same reference numerals or no reference numerals may be assigned, and their detailed description may also be omitted.

Figure 5:
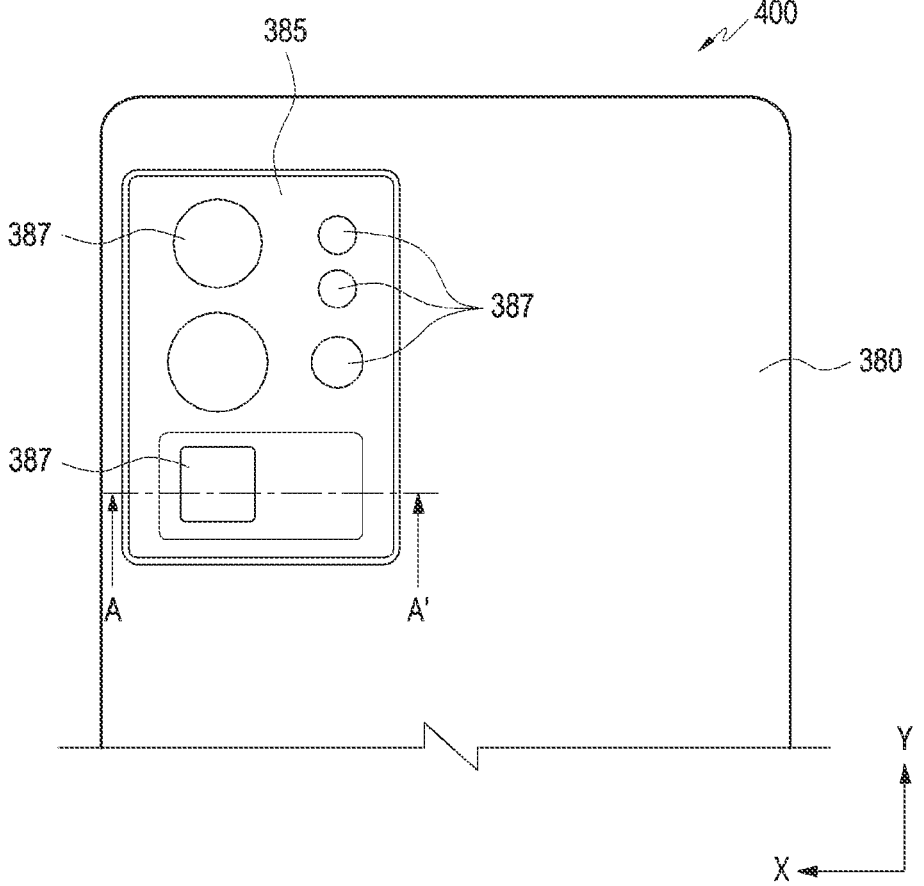
FIG. 5 is a diagram illustrating a plan view of a rear surface of an electronic device according to various embodiments.
Figure 6:
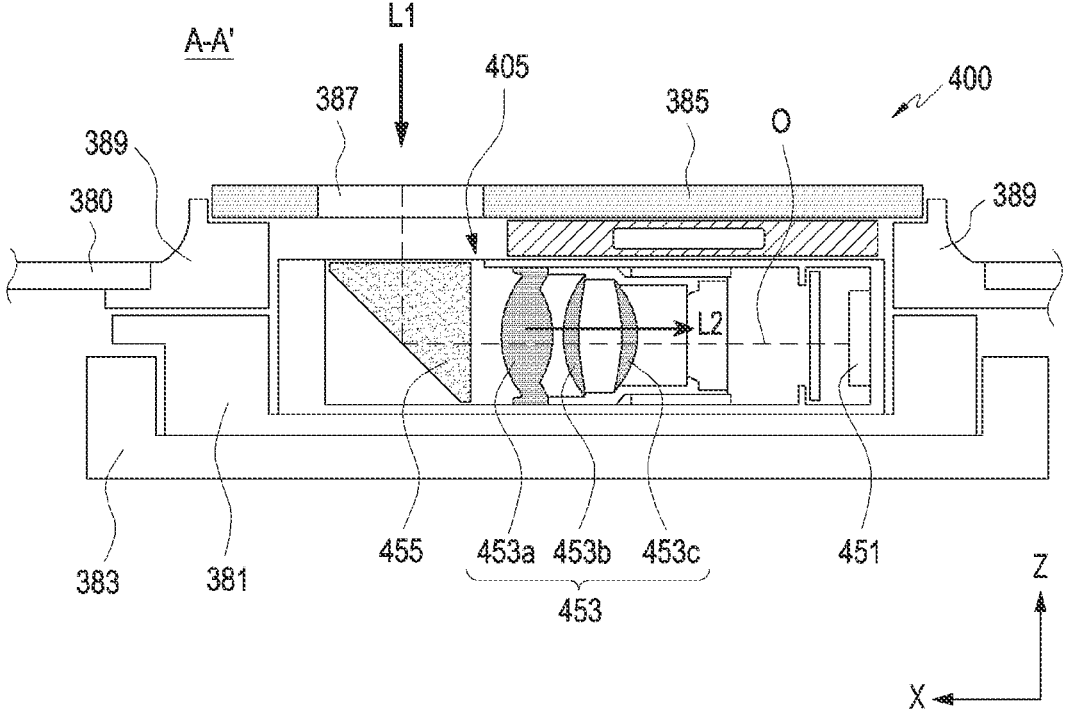
FIG. 6 is a cross-sectional view illustrating a portion of an electronic device, taken along A-A' of FIG. 5 according to various embodiments.

FIG. 5 is a diagram illustrating a plan view illustrating a rear surface of an electronic device 400 (e.g., the electronic devices 101, 102, 104, 200, and 300 of FIGS. 1 to 4) according to various embodiments. FIG. 6 is a cross-sectional view illustrating a portion of the electronic device 400, taken along A-A' of FIG. 5 according to various embodiments.

Referring to FIGS. 5 and 6, the electronic device 400 according to various embodiments of the disclosure may include a camera window 385 disposed on one surface (e.g., the second surface 210B of FIG. 3) thereof. In an embodiment, the camera window 385 may be a portion of the rear plate 380. In an embodiment, the camera window 385 may be coupled with the rear plate 380 through a decorative member (e.g., a frame) 389, and when viewed from the outside, the decorative member 389 may be exposed in a form surrounding the periphery of the camera window 385. According to an embodiment, the camera window 385 may include a plurality of transparent areas 387, and the electronic device 400 may receive light from the outside or radiate light to the outside through at least one of the transparent areas. For example, the electronic device 400 may include at least one camera module 405 (e.g., the camera modules 180, 205, 212, and 213 of FIGS. 1 to 3) disposed to correspond to at least some of the transparent areas 387, and at least one light source (e.g., an IR light source) disposed to correspond to others of the transparent areas 387. For example, the camera module or the light source may receive external light or radiate light to the outside of the electronic device 400 through any one of the transparent areas 387.

According to various embodiments, the electronic device 400 may include at least one of a wide-angle camera, an ultra-wide-angle camera, a close-up camera, a telephoto camera, or an IR photodiode as the camera module 405 or a light receiving element, and may include a flash (e.g., the flash 213 of FIG. 3) or an IR laser diode as the light source or a light emitting element. In an embodiment, the electronic device 400 may detect a distance or depth to a subject by emitting IR laser light toward the subject and receiving IR laser light reflected from the subject, using an IR laser diode and an IR photodiode. In an embodiment, the electronic device 400 may use any one or a combination of two or more of camera modules 405 to photograph a subject and use the flash to provide illumination toward the subject as needed.

According to various embodiments, the wide-angle camera, the ultra-wide-angle camera, or the close-up camera among the camera modules may have a smaller length in a direction of an optical axis O of lens(es) relative to the telephoto camera (e.g., the camera module 405). For example, the telephoto camera (e.g., the camera module 405) with a relatively large adjustment range of focal lengths may have a larger range of advance-and-retreat motions of lens(es) 453a, 453b, and 453c. In an embodiment, the wide-angle camera, the ultra-wide-angle camera, or the close-up camera may have a substantially small impact on the thickness of the electronic device 400 (e.g., a thickness measured in the Z-axis direction of FIG. 4 or FIG. 6), even though the lens(es) are arranged along the thickness direction of the electronic device 400. For example, the wide-angle camera, the ultra-wide-angle camera, or the close-up camera may be disposed on the electronic device 400, with a direction of light incident on the electronic device 400 from the outside and the direction of the optical axis of the lens(es) being substantially the same. In an embodiment, while compared to the wide-angle camera, the ultra-wide-angle camera, or the close-up camera, the camera module 405 (e.g., a telephoto camera) has a small field of view, the camera module 405 may be useful for photographing a subject at a greater distance, and may include more lens(es) 453a, 453b, and 453c or have a greater travel distance of the lens(es) 453a, 453b, and 453c in adjusting a focal length. For example, when the lens(es) 453a, 453b, and 453c of the camera module 405 are arranged in the thickness direction of the electronic device 400 (e.g., in the Z-axis direction), the thickness of the electronic device 400 may increase or the camera module 405 may protrude substantially to the outside of the electronic device 400.

According to various embodiments, a folded camera (e.g., the camera module 405) may include an optical member (e.g., a first optical member 455), such as a prism, to allow for freedom in the design of a direction (e.g., the direction of the optical axis O or a second incident direction L2 in FIG. 6) in which the lenses 453a, 453b, and 453c are arranged or arrangement of the lenses 453a, 453b, and 453c regardless of a direction in which external light is incident (e.g., a first incident direction L1 in FIG. 6). For example, the first optical member 455 may change the travel direction of the light and direct the light to the lenses 453a, 453b, and 453c by refracting or reflecting externally incident light.

According to various embodiments, the first incident direction L1 may be substantially parallel to the thickness direction of the electronic device 400, and the second incident direction L2 may be a direction intersecting the first incident direction L1 as the direction in which light refracted or reflected by the first optical member 455 travels. In an embodiment, the second incident direction L2 may be substantially perpendicular to the first incident direction L1 and parallel to the width direction (e.g., the X-axis direction in FIG. 2) or length direction (e.g., the Y-axis direction in FIG. 4) of the electronic device 400 or a housing (e.g., the housing 210 of FIG. 2).

The camera module 405 illustrated in FIG. 6 is an example of a folded camera or telephoto camera, in which the lens(es) 453a, 453b, and 453c may be arranged or disposed to advance or retreat along the width direction of the electronic device 400 (e.g., the direction parallel to the X axis). According to an embodiment, the camera module 405 may include the first optical member 455 that receives externally incident light and refracts or reflects the light, a second optical member 453 (e.g., a lens assembly) that enables the light refracted or reflected from the first optical member 455 to be incident on an image sensor, and/or an image sensor 451 aligned on the optical axis O of the second optical member 453. For example, the image sensor 451 may receive external light through the first optical member 455 and the second optical member 453. In an embodiment, external light may be incident on the first optical member 455 along the first incident direction L1, reflected or refracted from the first optical member 455, and incident on the image sensor 451 through the second optical member 453 along the second incident direction L2.

According to various embodiments, the first optical member 455 may include, for example, a prism, and reflect or refract light incident in the first incident direction L1 in the direction (e.g., the second incident direction L2 or the direction of the optical axis O) perpendicular to the first incident direction L1. While a configuration in which the first incident direction L1 and the second incident direction L2 are perpendicular is illustrated by way of example in this embodiment, various embodiments of the disclosure are not limited thereto, and an angle at which the first incident direction L1 and the second incident direction L2 intersect may vary depending on the structure of the electronic device 400 or the housing (e.g., the housing 210 of FIG. 2). In an embodiment, the second optical member 453 may be a lens assembly including at least one lens 453a, 453b, and 453c, in which the lens(es) 453a, 453b, and 453c are arranged along the second incident direction L2. In an embodiment, the first incident direction L1 may be parallel to the thickness direction (e.g., the Z-axis direction) of the electronic device 400, and the second incident direction L2 may be parallel to the width direction (e.g., the X-axis direction) or length direction (e.g., the Y-axis direction) of the electronic device.

According to various embodiments, the electronic device 400 may include a first camera support member 381 or a second camera support member 383. The first camera support member 381 or the second camera support member 383 may place or fix at least one of the camera module 405 and/or another camera module (e.g., the wide-angle camera, the ultra-wide-angle camera, or the close-up camera) adjacent to the camera module 405 on an interior side of the rear plate 380 or the camera window 385. In an embodiment, the first camera support member 381 or the second camera support member 383 may be substantially a portion of a first support member (e.g., the second support member 360 of FIG. 4) or a second support member (e.g., the first support member 311 of FIG. 4).

The camera module 405 or the electronic device 400 may further include a tube structure for placing the lens(es) 453a, 453b, and 453c at specified positions, and a drive device for moving the second optical member 453 (e.g., the lens(es) 453a, 453b, and 453c) forward and backward to adjust focusing, without reference made to or a detailed description of them. In an embodiment, the camera module 405 or the electronic device 400 may further include a drive device to move the image sensor 451 on a plane substantially perpendicular to the direction of the optical axis O, and may perform a hand tremor correction operation by moving the image sensor 451. In an embodiment, the hand tremor correction operation may be implemented by rotating or tilting the first optical member 455 (e.g., a prism). In the hand tremor correction operation, the first optical member 455 may be rotated or tilted in an angular range of approximately 1.5 degrees.

According to various embodiments, when combined with another camera module (e.g., the wide-angle camera, the ultra-wide-angle camera, or the close-up camera, which will be referred to as a 'first camera module' hereinafter), the camera module (e.g., the camera module 405 of FIG. 6, which is a telephoto camera and hereinafter referred to as a 'second camera module') may function as a tracking or scan camera that tracks a subject within an area of an image taken by the first camera module or scans a partial area of the image. An angular range in which the first optical member 455 is rotated or tilted in the operation of tracking a subject or scanning a portion of an image area may be greater than in the hand tremor correction operation.

Figure 7:
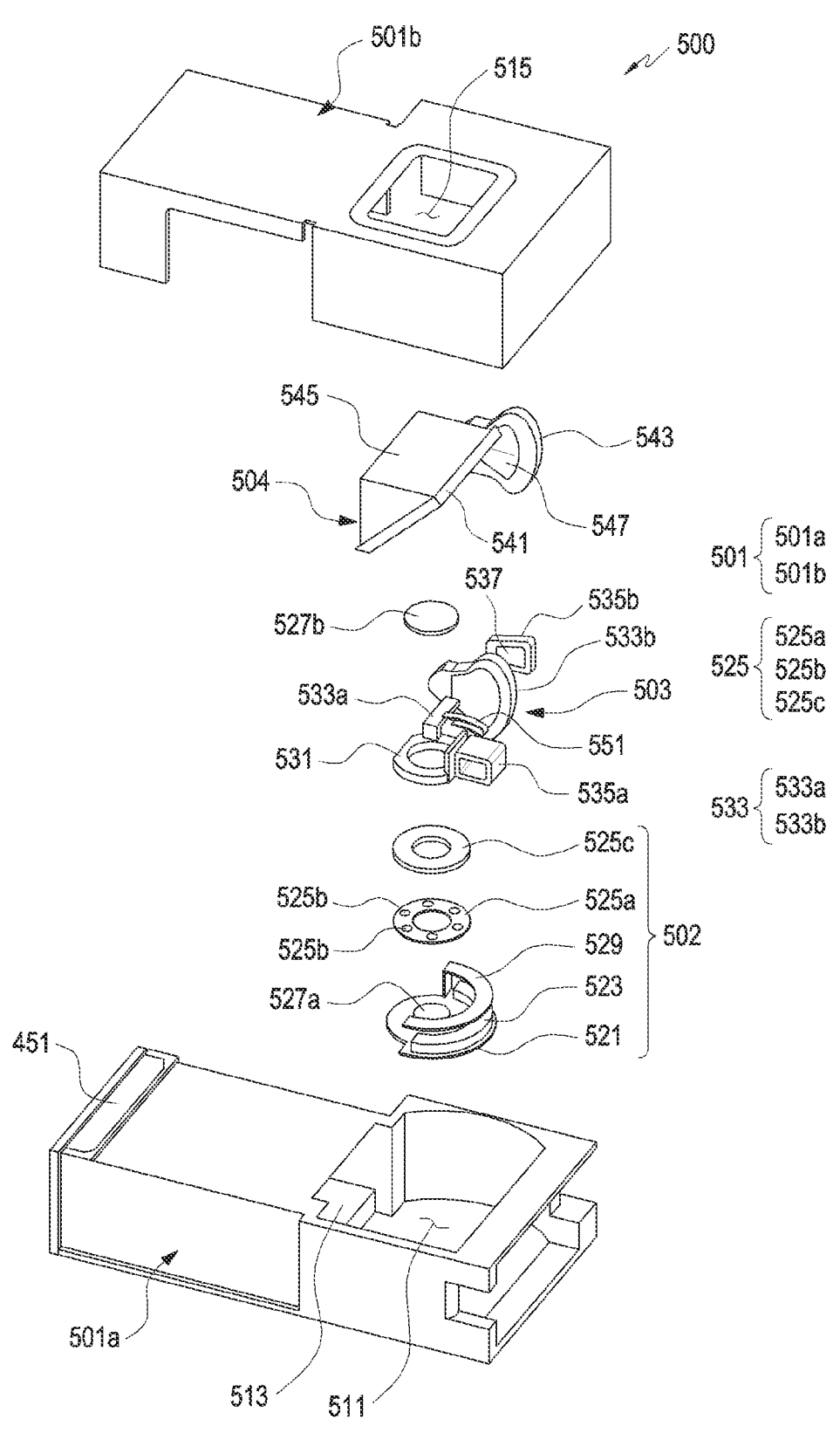
FIG. 7 is an exploded perspective view illustrating a camera module according to various embodiments.

With reference to FIG. 7 and other drawings, a description will be given below of a camera module 500 (e.g., the camera module 405 of FIG. 6) that uses a rotational or tilting motion of the first optical member 455 to track a subject or scan a portion of an image. In describing the configuration of the tracking or scan camera, reference may be made to the various example embodiments of FIGS. 1 to 6 as needed.

FIG. 7 is an exploded perspective view illustrating the camera module 500 (e.g., the camera module 405 of FIG. 6) according to various embodiments.

Referring to FIG. 7, the camera module 500 (e.g., the camera module 405 of FIG. 6 or a telephoto camera) may include a casing 501, a first guide unit 502, a first rotating unit 503, a second rotating unit 504, a first optical member 545 (e.g., the first optical member 455 of FIG. 6), a second optical member (e.g., the second optical member 453 of FIG. 6), and/or the image sensor 451. The first optical member 545, for example, a prism may be disposed on the second rotating unit 504 and rotate around two intersecting rotation axes (e.g., a first rotation axis A1 and a second rotation axis A2 in FIG. 14). For example, the orientation of the camera module may change or a subject may be tracked or scanned, depending on a rotational or tilting motion of the first optical member 545. In the following detailed description, a 'rotational motion' may refer to a motion in which the first optical member 545 rotates around the first rotation axis A1, and a 'tilting motion' may refer to a motion in which the first optical member 545 rotates around the second rotation axis A2.

According to various embodiments, the casing 501 may provide a first space 511 in which the first optical member 545 is disposed and a second space 513 in which the second optical member (e.g., a lens assembly as the second optical member 453 of FIG. 6) is disposed, and the image sensor 451 may be disposed adjacent to the second space 513 within the casing 501. As described below, the first rotating unit 503 or the second rotating unit 504 may rotate around the different rotation axes A1 and A2 by interaction between coils 535a and 535b and magnets 523 and 547, and the casing 501 may provide an electromagnetic shielding function to shield electromagnetic fields generated by the coils 535a and 535b and the magnets 523 and 547. According to an embodiment, the casing 501 may include a first casing 501a and a second casing 501b, and at least a portion of the first casing 501a and the second casing 501b may be made of an electromagnetic shielding material.

According to various embodiments, the first casing 501a may provide, for example, the first space 511 and the second space 513, and the second casing 501b may be coupled to surround at least a portion of the first casing 501a. The image sensor 451 may be disposed in the first casing 501a and connected to the first space 511 through the second space 513. The second space 513 may accommodate, for example, the second optical member 453 and be used as a space in which the second optical member 453 or the lens(es) 453a, 453b, and 453c included in the second optical member 453 may advance or retreat. In an embodiment, the second casing 501b may be made of a substantially electromagnetic shielding material and configured to close at least a portion of the first space 511. In an embodiment, the second casing 501b may include an opening area 515, which may be disposed between the first optical member 545 and a transparent area of a camera window (e.g., a transparent area 387 of the camera window 385 in FIG. 6). For example, external light may be incident on the first optical member 545 through the transparent area 387 of the camera window 385 and the opening area 515.

Figure 14:
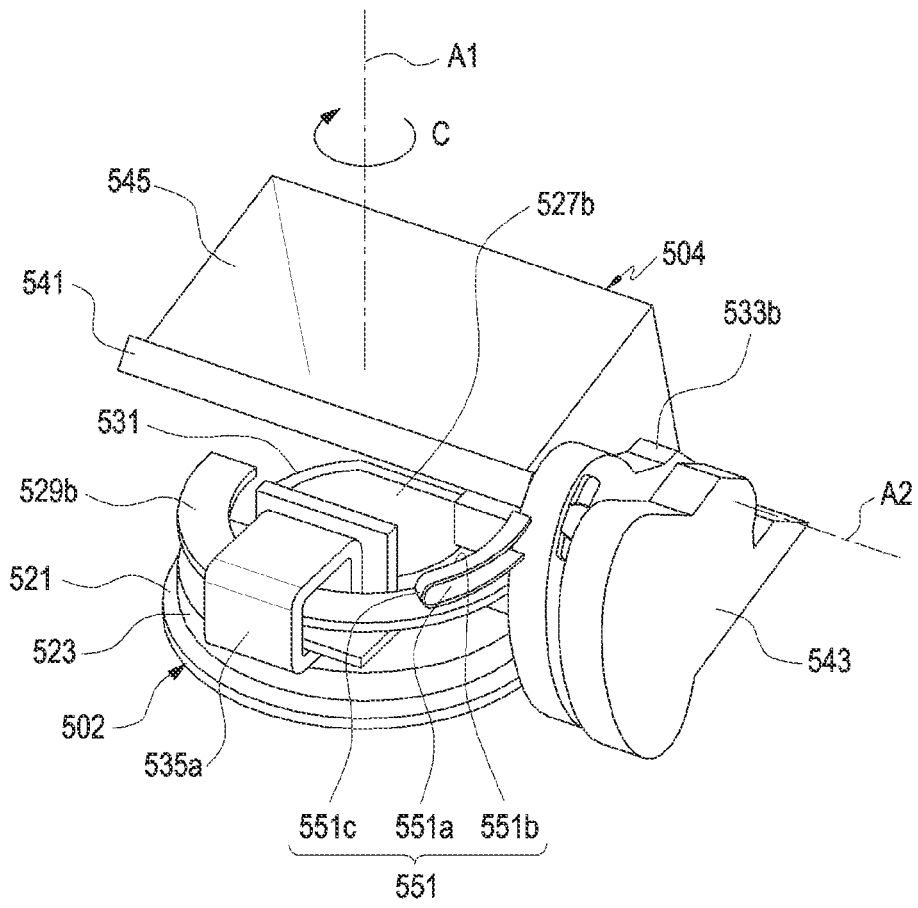
FIG. 14 is a perspective view illustrating a first guide unit, a rotation portion, and a second rotating unit assembled in a camera module according to various embodiments.

According to various embodiments, the first guide unit 502, the first rotating unit 503, the second rotating unit 504, and the first optical member 545 may be accommodated in the first space 511, and the first optical member 545 may be rotated or tilted around the two intersecting rotation axes (e.g., the first rotation axis A1 and the second rotation axis A2 in FIG. 14) inside the first space 511. According to an embodiment, the first guide unit 502 may be disposed or fixed in the casing 501, for example, in the first space 511 and guide the rotation of the first rotating unit 503. In an embodiment, the second rotating unit 504 may be coupled with the first rotating unit 503 to rotate together with the first rotating unit 503 (e.g., a rotational motion) or rotate with respect to the first rotating unit 503 (e.g., a tilting motion). For example, the first rotating unit 503 may rotate around the first rotation axis A1 with respect to the first guide unit 502, and the second rotating unit 504 may rotate together with the first rotating unit 503 around the first rotation axis A1 with respect to the first guide unit 502 or rotate around the second rotation axis A2 with respect to the first rotating unit 503. As the first optical member 545 is disposed, for example, on the second rotating unit 504, it may rotate around the first rotation axis A1 with respect to the first guide unit 502 and around the second rotation axis A2 the first rotating unit 503.

According to various embodiments, a motion in which the first optical member 545 rotates around the first rotation axis A1 may be referred to as a 'rotational motion' or a 'yawing motion,' and a motion in which the first optical member 545 rotates around the second rotation axis A2 may be referred to as a 'tilting motion' or a 'pitching motion'. In an embodiment, the motion in which the first optical member 545 rotates around the first rotation axis A1 may be referred to as a 'tilting motion' or a 'pitching motion,' and the motion in which the first optical member 545 rotates around the second rotation axis A2 may be referred to as a 'rotational motion' or a 'yawing motion'. As such, the motions of the first optical member 545 may be given different names, which may be selected appropriately based on the orientation of the camera module 500 (e.g., a telephoto camera or a scan camera as the camera module 405 of FIG. 6). In an embodiment, the camera module 500 may scan in a horizontal direction of a captured image through a rotational or yawing motion, and in a vertical direction of the captured image through a tilting or pitching motion. In an embodiment, when the orientation is changed, the camera module 500 may scan in the vertical direction of a captured image through a yawing motion and scan in the horizontal direction of the captured image through a pitching motion.

A more detailed description of an example configuration of the first guide unit 502 will be described with further reference to FIG. 8 below.

Figure 8:
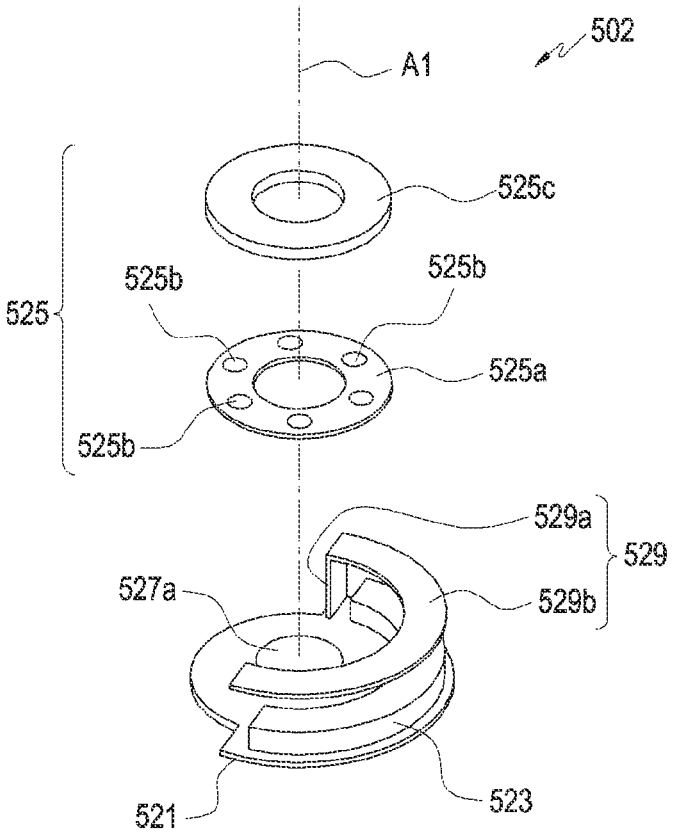
FIG. 8 is an exploded perspective view illustrating a first guide unit in a camera module according to various embodiments.

FIG. 8 is an exploded perspective view illustrating the first guide unit 502 in a camera module (e.g., the camera module 500 of FIG. 7) according to various embodiments.

Referring to FIGS. 7 and 8, the first guide unit 502 may include a disk-shaped guide base 521, a first magnet 523 and a fixed magnet 527a disposed on the guide base 521, a guide frame 529 extending from the guide base 521, and/or a support bearing 525. According to an embodiment, the guide base 521 may function as a yoke to focus a magnetic field of the first magnet 523 or the fixed magnet 527a, or an electric field of a first coil 535a to be described below, and may be disposed or fixed in the casing 501 (e.g., the first casing 501a) inside the first space 511. While not shown, the guide base 521 may include a bearing groove formed in an arc or circular trajectory around the periphery of the fixed magnet 527a, and function as a portion of the support bearing 525 to be described in greater detail below.

According to various embodiments, the first magnet 523 may have an arc shape extending in a specified angular range (e.g., a movable angular range θ in FIG. 16) centered on a point. For example, the first magnet 523 may be disposed along an arc trajectory centered on the first rotation axis A1 or a point where the first rotation axis A1 passes on the guide base 521. As described below, the first magnet 523 may be a monopole magnet, when viewed from a direction parallel to the first rotation axis A1 and a bipolar magnet, when viewed from a direction perpendicular to the first rotation axis A1. In an embodiment, the fixed magnet 527a may be circular in shape and disposed together with the first magnet 523 on one surface of the guide base 521. According to embodiments, the fixed magnet 527a may be disposed substantially on the first rotation axis A1.

According to various embodiments, the guide frame 529 may include a first frame 529a extending from the guide base 521 in a direction substantially parallel to the first rotation axis A1, and a second frame 529b extending in an arc shape bent at an end of the first frame 529a. In an embodiment, the first frame 529a may be located adjacent to one end of the first magnet 523, and the second frame 529b may be located to substantially face the first magnet 523 with a specified spacing between them in a direction substantially parallel to the first rotation axis A1. As described below, the guide frame 529 may be combined with a first coil bracket 531a of the first rotating unit 503 to guide the rotation of the first rotating unit 503.

According to various embodiments, the support bearing 525 may include a plurality of bearing balls 525b, a bearing plate 525a, and/or a bearing cover 525c. The bearing plate 525a may be ring-shaped or disk-shaped and rotatably accommodate or support the bearing balls 525b at designated position(s). In an embodiment, three or more bearing balls 525b may be arranged at equidistant intervals along a circumferential direction on the bearing plate 525a, and the bearing plate 525a may be rotatably disposed on the guide base 521 while being supported by the bearing balls 525b. For example, the bearing balls 525b may be disposed in contact with the guide base 521, and the bearing plate 525a may rotate around the first rotation axis A1 with respect to the guide base 521 based on a rolling motion of the bearing balls 525b, while spaced apart from the guide base 521.

According to various embodiments, the bearing cover 525c may be disposed to face the guide base 521 with the bearing balls 525b and/or the bearing plate 525a in between. In an embodiment, the bearing balls 525b and/or the bearing plate 525a may be disposed between the guide base 521 and the bearing cover 525c, and the bearing cover 525c may rotate with respect to the guide base 521 based on the rolling motion of the bearing balls 525b. In an embodiment, the bearing plate 525a and the bearing cover 525c may rotate around the first rotation axis A1 with respect to the guide base 521. In the illustrated embodiment, the bearing cover 525c and/or the bearing plate 525a may be substantially unconstrained to the guide base 521. As described below, the camera module 500 and/or the electronic device (e.g., the electronic device 400 of FIG. 5 or 6) may further include a first yoke 527b, and the first rotating unit 503 and/or the support bearing 525 may be rotatably constrained to the guide base 521 by a magnetic force generated between the first yoke 527b and the fixed magnet 527a. While a configuration is disclosed in which the fixed magnet 527a is disposed in the first guide unit 502 and the first yoke 527b is disposed in the first rotating unit 503 in this embodiment, it is to be noted that various embodiments of the disclosure are not limited thereto. For example, the fixed magnet 527a may be disposed in the first rotating unit 503, and the first yoke 527b may be disposed in the first guide unit 502.

According to various embodiments, the fixed magnet 527a may be disposed within an area surrounded by the support bearing 525, and the first magnet 523 may be disposed to surround at least a portion of the periphery of the support bearing 525. In an embodiment, the fixed magnet 527a, the support bearing 525, and/or the first magnet 523 may be coaxially arranged, and the support bearing 525 and/or the first magnet 523 may have a circular, ring, or arc shape substantially centered on the first rotation axis A1.

According to various embodiments, the first rotating unit 503 may be rotatably disposed on the first guide unit 502. For example, a portion of the first rotating unit 503 may be disposed on the support bearing 525 (e.g., the bearing cover 525c) and rotate together with the bearing plate 525a and/or the bearing cover 525c on the guide base 521. The configuration or arrangement of the first rotating unit 503 will be described with further reference to FIGS. 9 and 10.

Figure 9:
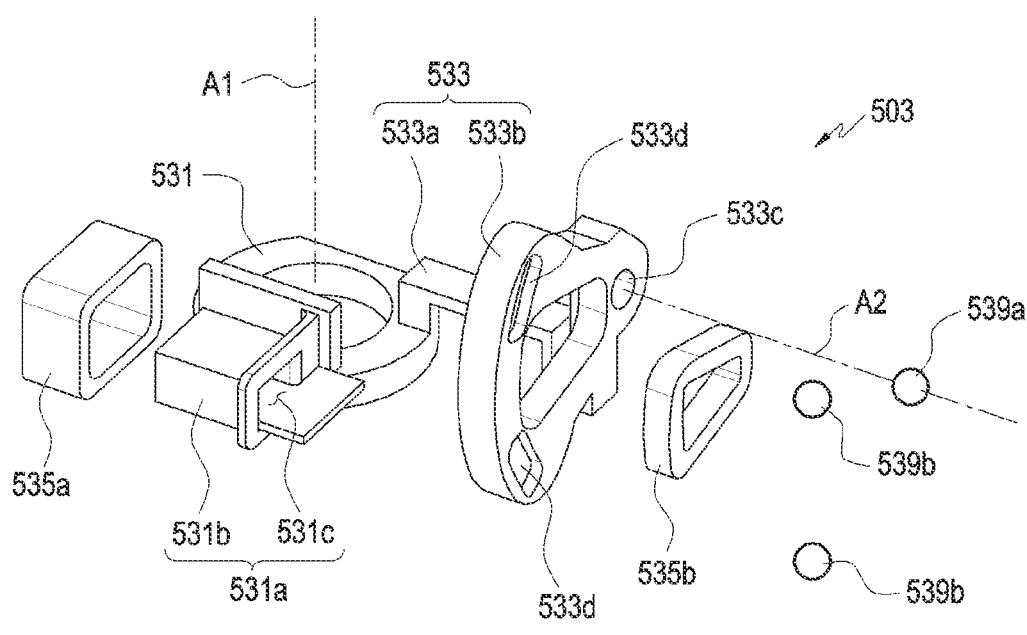
FIG. 9 is an exploded perspective view illustrating a first rotating unit in a camera module according to various embodiments.
Figure 10:
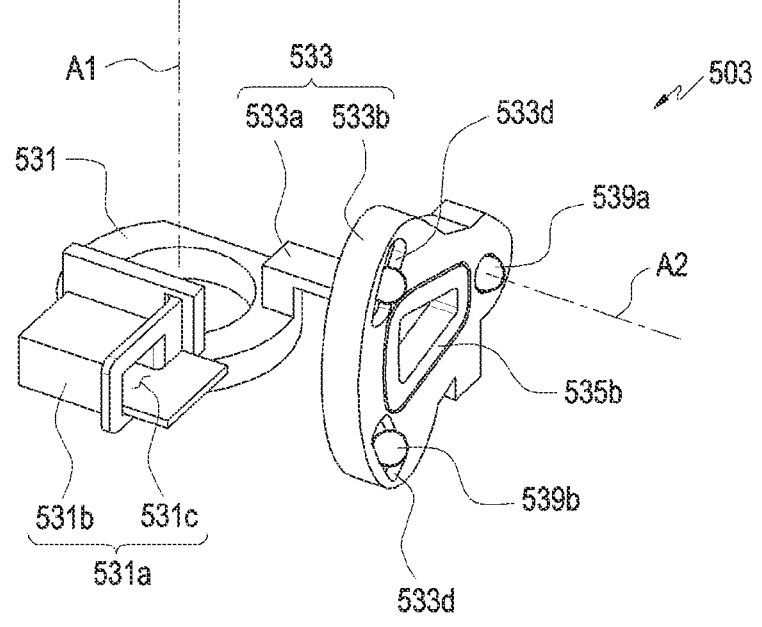
FIG. 10 is a perspective view illustrating a first rotating unit in a camera module according to various embodiments.

FIG. 9 is an exploded perspective view illustrating the first rotating unit 503 in a camera module (e.g., the camera module 500 of FIG. 7) according to various embodiments. FIG. 10 is a perspective view illustrating the first rotating unit 503 in the camera module 500 according to various embodiments.

Referring to FIGS. 7, 8, 9 and 10, the first rotating unit 503 may include a rotation base 531, the first coil bracket 531a, and/or a second guide unit 533. The rotation base 531 may be ring-shaped or disk-shaped, disposed to face the support bearing 525, for example, in the direction of the first rotation axis A1, and aligned to rotate around the first rotation axis A1. In an embodiment, the first yoke 527b (see FIG. 7 or 13) may be disposed on the rotation base 531 and located to face the fixed magnet 527a. For example, a magnetic force (e.g., attractive force) generated between the first yoke 527b and the fixed magnet 527a may cause the first rotating unit 503 (e.g., the rotation base 531) to closely contact the support bearing 525 and/or cause the support bearing 525 to be constrained to the guide base 521, and the first rotating unit 503 (e.g., the rotation base 531) may rotate around the first rotation axis A1 while being supported by the support bearing 525 (e.g. the bearing plate 525*a* or the bearing balls 525*b*). Although the first yoke 527*b* and the rotation base 531 are shown as separate components in the illustrated embodiment, various embodiments of the disclosure are not limited thereto, and the first yoke 527*b* may be substantially a portion of the rotation base 531 depending on a fabrication or assembly process.

According to various embodiments, the first coil bracket 531*a* may be formed on the rotation base 531 to revolve around the first rotation axis A1, and may be disposed at a position substantially corresponding to the first magnet 523. For example, when the rotation base 531 rotates around the first rotation axis A1, the first coil bracket 531*a* may move along a trajectory in which the first magnet 523 is disposed. In an embodiment, the first coil bracket 531*a* may include a mounting core 531*b* around which the first coil 535*a* is mounted, and a guide hole 531*c* defined or surrounded by the mounting core 531*b*. The first coil 535*a* may be disposed substantially around the mounting core 531*b*, and on the first guide unit 502, the guide hole 531*c* may at least partially accommodate a portion (e.g., the first frame 529*a*) of the guide frame 529. For example, the first coil 535*a* may be disposed substantially facing or adjacent to the first magnet 523, and when the rotation base 531 rotates, the mounting core 531*b* or the first coil 535*a* may move along a trajectory along which the second frame 529*b* is extended.

According to various embodiments, upon application of an electrical signal, the first coil 535*a* may generate an electric field, and an electromagnetic force generated by the first coil 535*a* and the first magnet 523 may act substantially as a driving force to rotate the first rotating unit 503 with respect to the first guide unit 502 (e.g., the guide base 521). For example, the first coil 535*a* may move on the first magnet 523 along an arc trajectory centered around the first rotation axis A1 according to rotation of the first rotating unit 503, while generating a driving force to rotate the first rotating unit 503 (e.g., the rotation base 531). In an embodiment, an angular range of rotation of the first rotating unit 503 and/or an angular range of the arc trajectory along which the first coil 535*a* moves may be equal to or smaller than the movable angular range θ of FIG. 16, and these angular ranges will be described in greater detail below with reference to FIG. 20.

According to various embodiments, an electrical signal applied to the first coil 535*a* may generate an attractive or repulsive force between the first coil 535*a* and the first magnet 523. While not shown, the camera module 500 or the electronic device 400 may further include a guide member disposed inside the guide hole 531*c*, and the guide member (or the guide hole 531*c*) may be combined with the guide frame 529 (e.g., the second frame 529*b*) to allow the first coil 535*a* to move in an arc direction, restricting movement of the first coil 535*a* in a direction approaching or receding from the first magnet 523. For example, the first coil 535*a* and the first magnet 523 may remain at substantially the same distance or interval from each other, even though an attractive or repulsive force is generated between the first coil 535*a* and the first magnet 523. In an embodiment, the guide member may be made of a lubricious polymeric material, such as polyoxymethylene (POM) or acetal, and may be substantially in sliding contact with the guide frame 529 (e.g., the second frame 529*b*) when the rotation base 531 rotates.

According to various embodiments, the second guide unit 533 may include an extension 533*a* extending from the first rotating unit 503 in a direction intersecting the first rotation axis A1, and a second coil bracket 533*b* provided at an end of the extension 533*a*. According to an embodiment, the second coil bracket 533*b* may be disposed at a specified distance from the first rotation axis A1 and revolve around the first rotation axis A1 in response to rotation of the rotation base 531. For example, a movement trajectory of the second coil bracket 533*b* may be substantially coaxially aligned with the arc shape of the first magnet 523. In an embodiment, the second guide unit 533 and/or the second coil bracket 533*b* may further include the second coil 535*b* and guide balls 539*a* and 539*b* disposed on one surface of the second coil bracket 533*b*. For example, the second coil 535*b* may be disposed exposed on the one surface of the second coil bracket 533*b*, and the guide balls 539*a* and 539*b* may be arranged around the second coil 535*b*.

According to various embodiments, the second coil bracket 533*b* may further include a first guide groove 533*c* and a plurality of second guide grooves 533*d*, which are formed on one surface thereof. The first guide groove 533*c* may have a curved shape with a depth less than a diameter of the guide balls 539*a* and 539*b*, and the second guide grooves 533*d* may have a depth less than the diameter of the guide balls 539*a* and 539*b* and extend in an arc trajectory centered on the first guide groove 533*c*. A first guide ball 539*a* of the guide balls 539*a* and 539*b* may be disposed in the first guide groove 533*c*, and a second guide ball 539*b* of the guide balls 539*a* and 539*b* may be disposed in any one of the second guide grooves 533*d*. According to an embodiment, any one (e.g., the first guide ball 539*a*) of the guide balls 539*a* and 539*b* may be disposed in the first guide groove 533*c* to form, maintain, or support the second rotation axis A2, and the guide balls 539*a* and 539*b* may be disposed on a plane substantially perpendicular to the second rotation axis A2. In an embodiment, for example, when the second rotating unit 504 is disposed on the first rotating unit 503, the second rotating unit 504 may rotate substantially around the second rotation axis A2 or the first guide ball 539*a*, and the second guide balls 539*b* may guide rotation of the second rotating unit 504 relative to the first rotating unit 503, while moving inside the second guide groove(s) 533*d*.

According to various embodiments, the first optical member 545 may be disposed substantially on the second rotating unit 504 so that it may rotate around the first rotation axis A1 together with the first rotating unit 503 and the second rotating unit 504 and around the second rotation axis A2 together with the second rotating unit 504. The configuration of the second rotating unit 504 will be described with further reference to FIGS. 11 and 12.

Figure 11:
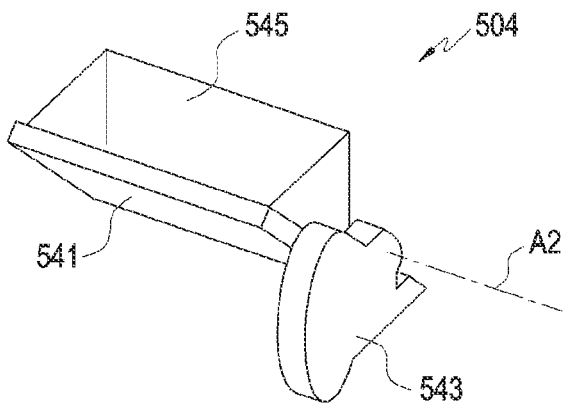
FIG. 11 is a perspective view illustrating a second rotating unit in a camera module according to various embodiments.
Figure 12:
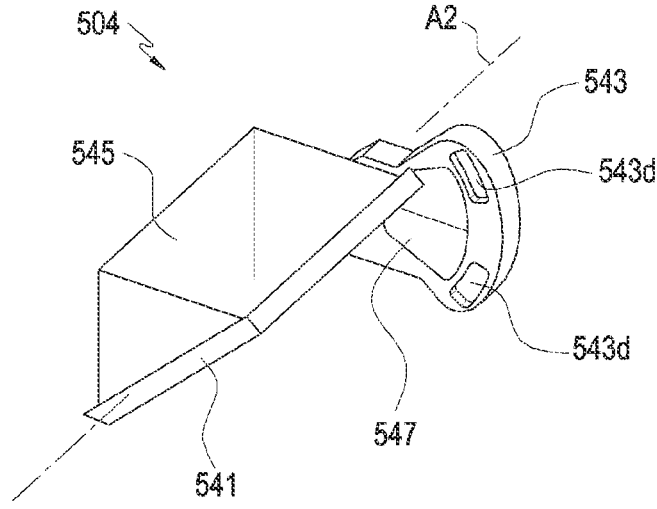
FIG. 12 is a perspective view illustrating a second rotating unit in a camera module, viewed from a different direction according to various embodiments.

FIG. 11 is a perspective view illustrating the second rotating unit 504 in a camera module (e.g., the camera module 500 of FIG. 7) according to various embodiments. FIG. 12 is a perspective view illustrating the second rotating unit 504 in the camera module 500 viewed from a different direction according to various embodiments.

Referring to FIGS. 7, 8, 9, 10, 11 and 12, the second rotating unit 504 may include a holding plate 541 and/or a magnetic bracket 543, and the first optical member 545 such as a prism may be disposed on the holding plate 541. In an embodiment, the holding plate 541, which has a flat plate shape supporting the first optical member 545, may be disposed on the first rotation axis A1 to be inclined to the first rotation axis A1, and the magnet bracket 543 may be provided on one side of the holding plate 541 and disposed to face the second coil bracket 533b. According to an embodiment, the second magnet 547 facing the second coil 535b in the direction parallel to the second rotation axis A2 may be disposed on the magnet bracket 543.

According to various embodiments, a second yoke 537 may be disposed on the other surface of the second coil bracket 533b, and a magnetic force generated between the second yoke 537 and the second magnet 547 may act in a direction that brings the magnet bracket 543 into close contact with the second coil bracket 533b. In an embodiment, the magnet bracket 543 may include third guide grooves 543d formed on one surface thereof. A third guide grooves 543d may extend in an arc trajectory centered on the second rotation axis A2 and be disposed to correspond to any one of the second guide grooves 533d or any one of the second guide balls 539b. For example, portions of the guide balls 539a and 539b may be accommodated in the first guide groove 533c or the second guide grooves 533d, and the other portions of the second guide balls 539b may be accommodated in the third guide grooves 543d. In an embodiment, the guide balls 539a and 539b may partially protrude from one surface of the second coil bracket 533b, and a magnetic force generated between the second yoke 537 and the second magnet 547 may allow the magnet bracket 543 to be coupled with the second coil bracket 533b with a specified spacing in between. For example, the magnetic force between the second yoke 537 and the second magnet 547 may cause the magnet bracket 543 to be coupled with the second coil bracket 533b, with the guide balls 539a and 539b forming or maintaining a specified spacing between the second coil bracket 533b and the magnet bracket 543.

According to various embodiments, the first guide ball 539a of the guide balls 539a and 539b may be at a substantially fixed position on the second coil bracket 533b (e.g., where the second rotation axis A2 passes) due to the shape of the first guide groove 533c and capable of rolling within the first guide groove 533c. For example, the first guide ball 539a may provide a center of rotation of the magnet bracket 543 with respect to the second coil bracket 533b. In an embodiment, when the second rotating unit 504 rotates with respect to the first rotating unit 503, the second guide ball(s) 539b may guide or support the rotation of the second rotating unit 504, while moving along a trajectory in which the second guide grooves 533d or the third guide grooves 543d are extended. For example, the magnet bracket 543 may rotate with respect to the second coil bracket 533b on a plane substantially perpendicular to the second rotation axis A2.

Figure 13:
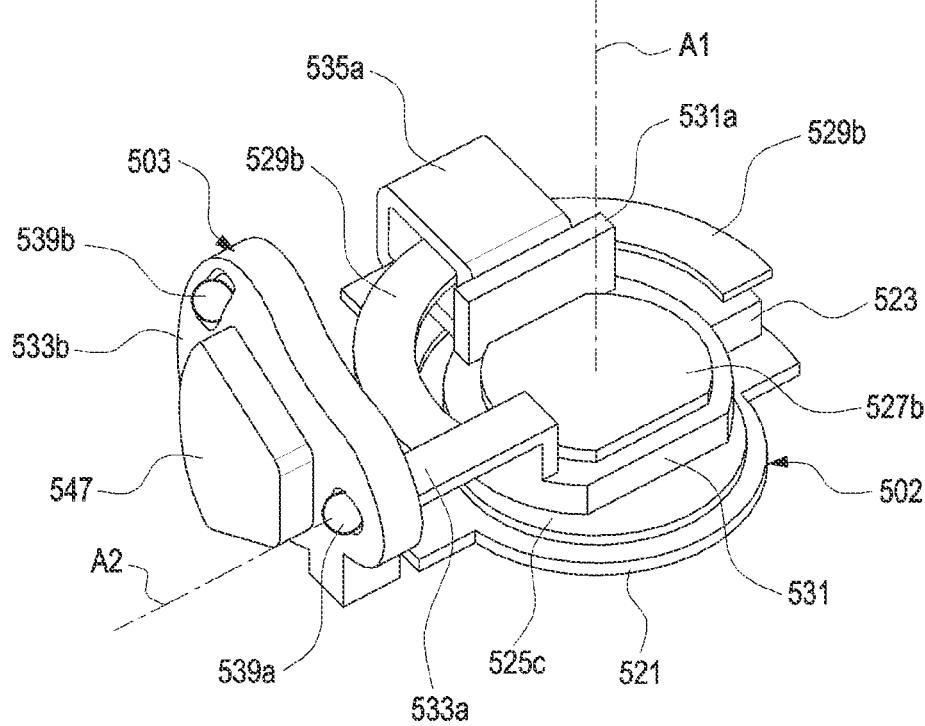
FIG. 13 is a perspective view illustrating a first guide unit and a first rotating unit assembled in a camera module according to various embodiments.

FIG. 13 is a perspective view illustrating the first guide unit 502 and the first rotating unit 503 assembled in a camera module (e.g., the camera module 500 of FIG. 7) according to various embodiments. FIG. 14 is a perspective view illustrating the first guide unit 502, the first rotating unit 503, and the second rotating unit 504 assembled in the camera module 500 according to various embodiments.

Referring to FIGS. 13 and 14, with the first coil 535a disposed, the first rotating unit 503 may be coupled with or disposed on the first guide unit 502. In an embodiment, the first yoke 527b may be disposed to face the fixed magnet 527a with the support bearing 525 and/or the first rotating unit 503 (e.g., the rotation base 531) in between, and the first yoke 527b and the fixed magnet 527a may generate an attractive force acting in the direction of the first rotation axis A1. For example, a magnetic force generated between the first yoke 527b and the fixed magnet 527a may constrain the rotation base 531, the bearing cover 525c, and/or the bearing plate 525a in a rotatable state between the first yoke 527b and the guide base 521. In an embodiment, the first yoke 527b, together with the rotation base 531 and/or bearing cover 525c, may rotate around the first rotation axis A1 with respect to the guide base 521, and the bearing plate 525a and/or the bearing balls 525b may guide or support this rotation.

According to various embodiments, although the first rotating unit 503 may rotate freely on the first guide unit 502, the first rotating unit 503 may be interfered with by the casing 501 or other structures within the first space 511, or may be controlled by an electrical signal applied to the first coil 535a to rotate by a specified angular range (e.g., the movable angular range θ in FIG. 16) or between specified angular positions. For ease of description, a range in which the first rotating unit 503 rotates is, illustrated as the movable angular range θ in FIG. 16, which may refer to an angle at which the first magnet 523 is extended in an arc trajectory. However, various embodiments of the disclosure are not limited thereto, and the angular range in which the first rotating unit 503 rotates under control of an electrical signal applied to the first coil 535a may be smaller than the movable angular range θ of FIG. 16.

According to various embodiments, in the angular range in which the first rotating unit 503 rotates, the guide frame 529 (e.g., the second frame 529b) may be located at least partially within the first coil bracket 531a (e.g., the guide hole 531c of FIG. 9). For example, the first coil bracket 531a may revolve around the first rotation axis A1, while still partially accommodating the second frame 529b. According to an embodiment, the guide frame 529 and the first coil bracket 531a (e.g., the guide hole 531c or the guide member disposed within the guide hole 531c) may be combined to guide the rotation of the first rotating unit 503 or prevent and/or reduce the first coil 535a from moving or reciprocating along the direction of the first rotation axis A1.

According to various embodiments, the second guide unit 533, for example, the extension 533a may be extended from the rotation base 531 at a position closer to the first rotation axis A1 than the first magnet 523 and disposed across the guide frame 529 (e.g., the second frame 529b). For example, as the first rotating unit 503 rotates, the extension 533a may move along the direction in which the second frame 529b is extended, while maintaining a specified spacing from the guide frame 529. In an embodiment, the second coil bracket 533b may be provided at an end of the extension 533a at a position farther from the first rotation axis A1 than the first magnet 523. For example, when the first rotating unit 503 rotates, the second coil bracket 533b may move along an arc trajectory surrounding the first magnet 523.

According to various embodiments, the second rotating unit 504 may be disposed on or coupled with the first rotating unit 503, with the magnet bracket 543 facing the second coil bracket 533b. For example, the second coil bracket 533b and the magnet bracket 543 may be coupled to face each other by a magnetic force (e.g., attractive force) between the second yoke 537 disposed on the second coil bracket 533b and the second magnet 547 disposed on the magnet bracket 543, and the second rotating unit 504 may be disposed to be rotatable around the second rotation axis A2 with respect to the first rotating unit 503 (e.g., the second guide unit 533). Thus, the first optical member 545 may rotate around the first rotation axis A1 on the first guide unit 502 (e.g., the guide base 521), together with the first rotating unit 503 and the second rotating unit 504, and rotate around the second rotation axis A2 on the first rotating unit 503, together with the second rotating unit 504.

According to various embodiments, the first guide unit 502, for example, the guide base 521 may be disposed in or fixed to the casing 501 (e.g., the first space 511), and the first optical member 545 may be disposed to face the opening area 515. When the first guide unit 502 is disposed in the casing 501, the first rotating unit 503, the second rotating unit 504, and/or the first optical member 545 may be substantially accommodated in the first space 511 and make a rotational or tilting motion within the first space 511. According to an embodiment, a surface of the first optical member 545 facing the opening area 515 or an external space of the electronic device 400 may be disposed substantially perpendicular to the first rotation axis A1 on the whole, and may be disposed to be inclined to the first rotation axis A1 as the second rotating unit 504 rotates around the second rotation axis A2. One surface of the first optical member 545 may be disposed to substantially face the second space 513, and light incident from the outside and refracted or reflected by the first optical member 545 may be incident into the second space 513, for example, on the second optical member 453.

According to various embodiments, the second optical member 453 may align or focus the incident light and direct the light to the image sensor 451. As described with reference to FIG. 6, the second optical member 453, for example, the lens(es) 453a, 453b, and 453c of the lens assembly, may be arranged in the width direction (e.g., the X-axis direction in FIGS. 4 to 6) or length direction (e.g., the Y-axis direction in FIGS. 4 to 6) of the electronic device 400 or the housing (e.g., housing 210 of FIG. 2). For example, the number or advancing or receding distance of the lenses 453a, 453b, and 453c in the second optical member 453 may be freely designed, and the camera module 405 or 500 of FIG. 6 or 7 may function as a telephoto camera.

According to various embodiments, the camera module 500 and/or the electronic device 400 may further include a flexible printed circuit board (FPCB) 551 connected to the first rotating unit 503 via the first guide unit 502. For example, a wiring for providing power or an electrical signal to the first rotating unit 503 may be disposed via the first guide unit 502. The FPCB 551 may be disposed such that two different portions thereof at least partially face each other, thereby preventing/reducing a repulsive force generated by the FPCB 551 itself from exerting an effect on the rotational motion of the first rotating unit 503. In an embodiment, the FPCB 551 may be disposed on the first guide unit 502 along the guide frame 529.

According to various embodiments, the FPCB 551 may include a first section 551a disposed along an arc trajectory centered on the first rotation axis A1, and a second section 551b bent from the first section 551a and at least partially facing the first section 551a, and the second section 551b may be disposed along the arc trajectory and connected to the first rotating unit 503. On the first rotating unit 503, a portion of the FPCB 551 may be disposed fixed and electrically connected to the first coil 535a and/or the second coil 535b. In an embodiment, the FPCB 551 may be disposed along the first frame 529a onto the second frame 529b on the first guide unit 502, and the first section 551a may refer to a section disposed substantially on the second frame 529b. In an embodiment, as a connecting section 551c is provided between the first section 551a and the second section 551b, the second section 551b may be disposed on the second frame 529b, facing the first section 551a. In an embodiment, when the first rotating unit 503 rotates in a clockwise direction C in FIG. 14, the second section 551b may gradually become shorter, while the first section 551a may gradually become longer. On the contrary, when the first rotating unit 503 rotates in a counterclockwise direction, the second section 551b may gradually become longer, while the first section 551a may gradually become shorter. In an embodiment, the connecting section 551c may move along the trajectory along which the second frame 529b is extended, depending on the rotation of the first rotating unit 503 and/or a change in length of the first section 551a and the second section 551b. For example, the connecting section 551c may refer to a section or portion of the FPCB 551 that varies with rotation of the first rotating unit 503, other than a specified section or portion.

According to various embodiments, a spacing between the first coil 535a and the second coil 535b and/or a spacing between the first magnet 523 and the second coil 535b may always be constant regardless of the rotation of the first rotating unit 503. For example, the first coil 535a and the second coil 535b may be at specified positions on the first rotating unit 503, and an arc trajectory along which the second coil 535b moves may be substantially coaxially aligned with the arc-shaped first magnet 523. Therefore, an operating environment based on a rotational or tilting position of the first rotating unit 503 or the second rotating unit 504 may be substantially uniform, and control of a rotational or tilting motion using the coils 535a and 535b and the magnets 523 and 547 may be facilitated.

Figure 15:
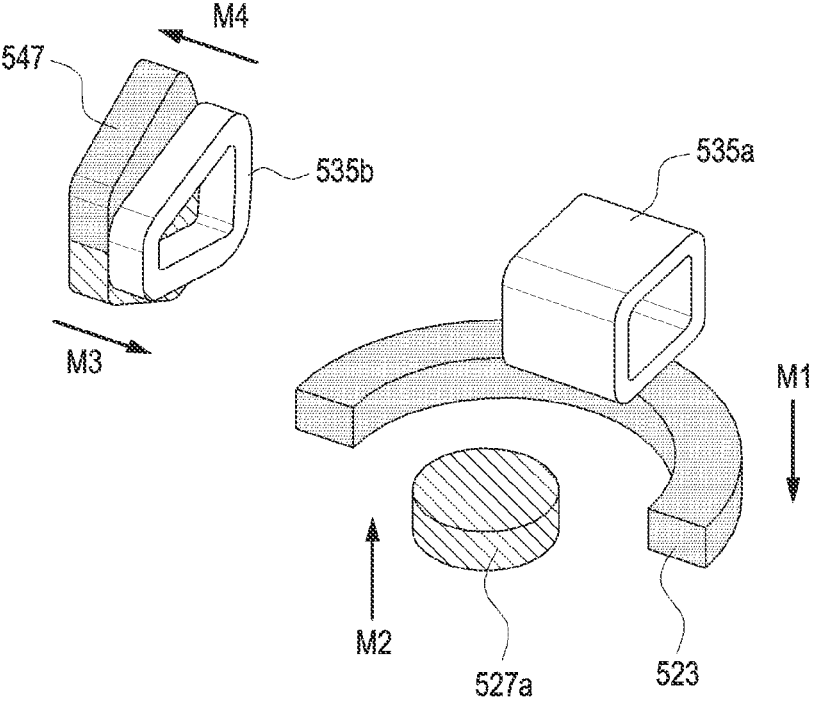
FIG. 15 is a perspective view illustrating magnetization directions of magnets in a camera module according to various embodiments.

FIG. 15 is a diagram including perspective views illustrating magnetization directions of the magnets 523, 527a, and 547 in a camera module (e.g., the camera module 500 of FIG. 7) according to various embodiments.

Referring to FIG. 15, the first magnet 523 may be a monopole magnet and magnetized in an arrowed direction M1 when viewed in a plan view or from the direction of the first rotation axis A1 of FIG. 14. Similar to the first magnet 523, the fixed magnet 527a may be a monopole magnet when viewed in a plan view or from the direction of the first rotation axis A1 and magnetized in an arrowed direction M2, which is opposite to the first magnet 523. In an embodiment, when viewed from the second coil 535b or the direction of the second rotation axis A2 in FIG. 14, the second magnet 547 may be a bipolar magnet, and when one of an N-pole portion and an S-pole portion is magnetized in an arrowed direction M3, the other of the N-pole portion and the S-pole portion may be magnetized in an arrowed direction M4. According to various embodiments, the magnetization directions of the magnets 523, 527a, and 547 may not be limited to the example combination illustrated in FIG. 15.

Figure 16:
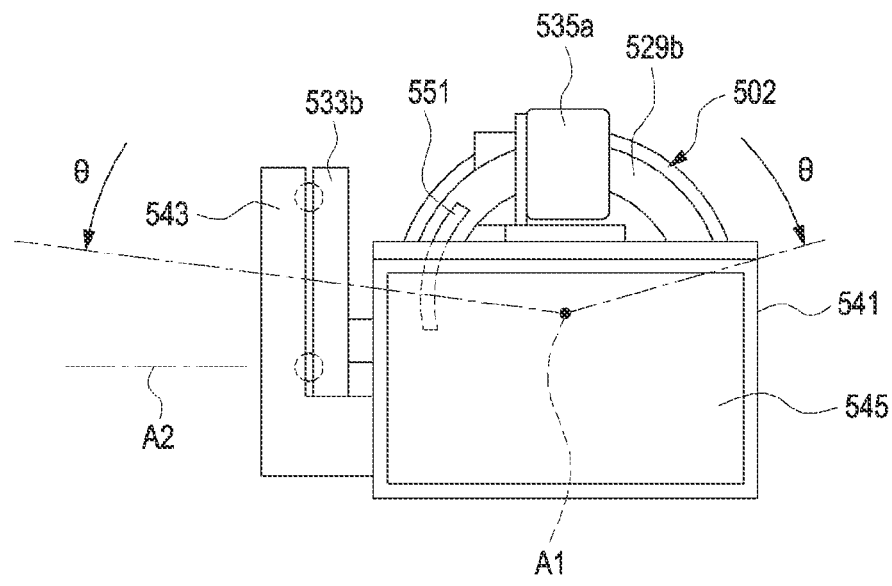
FIGS. 16 and 17 are diagrams illustrating a rotational motion of a camera module according to various embodiments.
Figure 17:
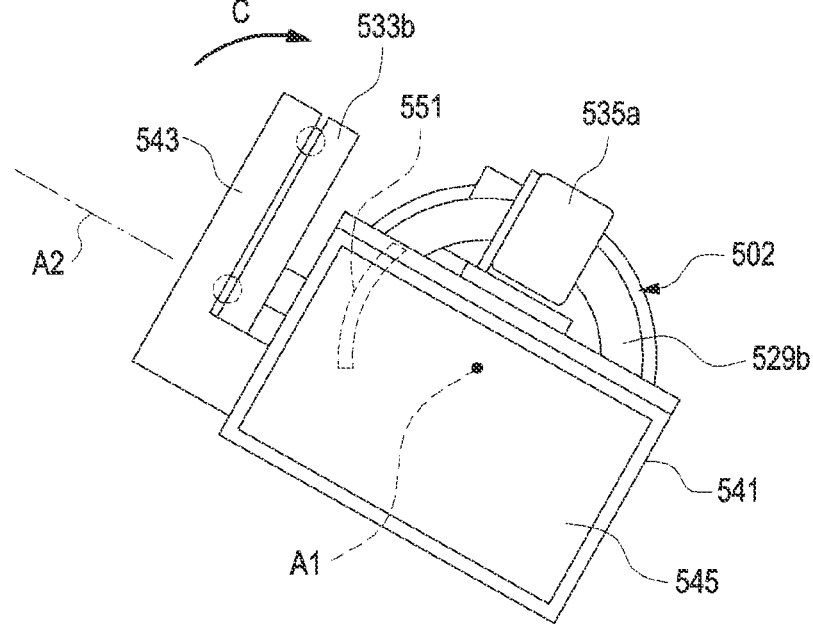

FIGS. 16 and 17 are diagrams illustrating a rotational motion of a camera module (e.g., the camera module 500 of FIG. 7) according to various embodiments.

Referring to FIGS. 16 and 17, the camera module 500 and/or the electronic device 400 (e.g., the processor 120 of FIG. 1) may generate an electric field using the first coil 535a by applying an electrical signal to the first coil 535a, and an electromagnetic force generated between the first coil 535a and the first magnet 523 may act as a driving force to rotate the first rotating unit 503 around the first rotation axis A1. According to an embodiment, an angular range in which the first coil 535a rotates, for example, the movable angular range θ, may substantially correspond to an angular section in which the first magnet 523 is disposed. In an embodiment, the movable angular range θ may be smaller than the angular section in which the first magnet 523 is disposed.

In the arrangement shown in FIGS. 16 and 17, when the first rotating unit 503 and/or the first optical member 545 rotate in the clockwise direction C, the second section 551*b* of the FPCB 551 may gradually become shorter, and the first section 551*a* may gradually become longer. For example, the connecting section 551*c* may gradually move in the clockwise direction C on the first frame 529*a*. In an embodiment, when the first rotating unit 503 and/or the first optical member 545 rotates in the counterclockwise direction, the second section 551*b* may gradually become longer, and the first section 551*a* may gradually become shorter. For example, the connecting portion 551*c* may gradually move in the counterclockwise direction on the first frame 529*a*. In an embodiment, an angle by which the connecting portion 551*c* revolves around the first rotation axis A1 may be smaller than an angle by which the first rotating unit 503 rotates. For example, a distance moved by the connecting portion 551*c* may be smaller than a distance moved by the extension 533*a* on the second frame 529*b*.

According to various embodiments, at an initial position where the first optical member 545 is disposed in the casing 501, the optical axis O of the second optical member 435 may be substantially perpendicular to the first rotation axis A1 and the second rotation axis A2, and the first rotating unit 503 or the first optical member 545 may rotate clockwise or counterclockwise within the first space 511. For example, at the initial position, the first coil 535*a* or the second coil 535*b* may be substantially at a position illustrated in FIG. 17, and move in the clockwise direction C or the counterclockwise direction based on the rotational (or yawing) motion of the first rotating unit 503. However, various embodiments of the disclosure are not limited thereto, and at the initial position, the coils 535*a* and 535*b* may be located as illustrated in FIG. 16, and located variously in consideration of the shapes or extended angular ranges of other components (e.g., the first magnet 523). For example, at the initial position, the coils 535*a* and 535*b* may be located such that the distance between the first coil 535*a* and the second coil 535*b* and/or the distance between the first magnet 523 and the second coil 535*b* is maintained substantially constant, regardless of the rotational motion of the first rotating unit 503. In the illustrated embodiment, the movable angular range θ is exemplified as an angular range in which the first magnet 523 is disposed. However, the movable angular range θ may be smaller than the illustrated angular range in a scanning operation of the camera module 500. This movable angular range will be described in greater detail below with reference to FIG. 20.

According to various embodiments, the first magnet 523 may have an arc shape of an angular range including an angular section in which the first coil 535*a* moves and/or an angular section in which the second coil 535*b* moves. For example, in the scanning operation of the camera module 500, the first coil 535*a* and the second coil 535*b* may be located substantially adjacent to the first magnet 523, and the second coil 535*b* may be aligned with a portion of the first magnet 523 in a radial direction from the first rotation axis A1. Thus, the distance between the first coil 535*a* and the second coil 535*b* and/or the distance between the first magnet 523 and the second coil 535*b* may be maintained substantially constant, regardless of the rotational motion of the first rotary portion 503. In an embodiment, as the second yoke 537 is disposed substantially between the second coil 535*b* or the first magnet 523, the second coil 535*b* or the second magnet 547 may be provided with an electromagnetically shielded operating environment with respect to the first coil 535*a* and/or the first magnet 523.

Figure 18:
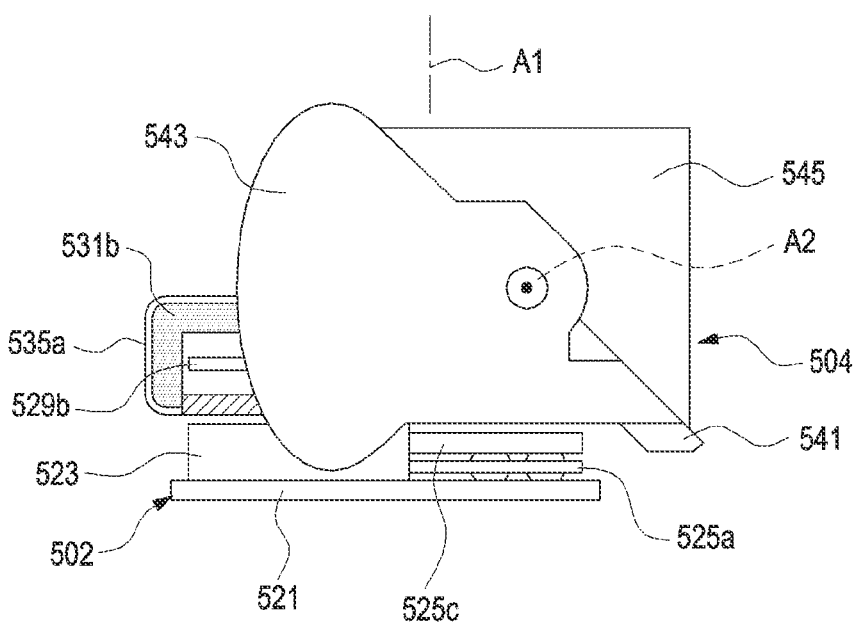
FIGS. 18 and 19 are diagrams illustrating a tilting motion of a camera module according to various embodiments.
Figure 19:
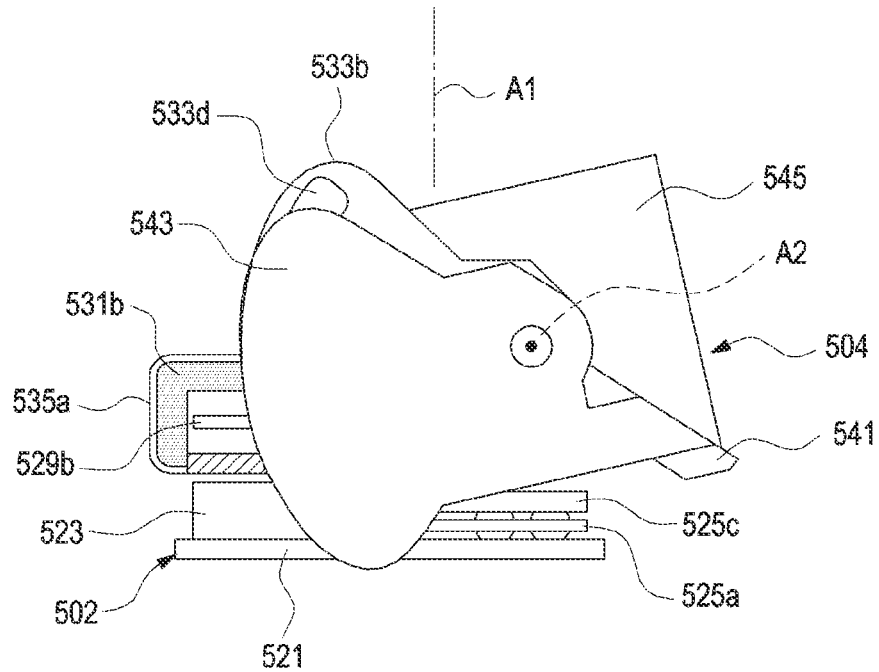

FIGS. 18 and 19 are diagrams illustrating a tilting motion of a camera module (e.g., the camera module 500 of FIG. 7) according to various embodiments.

Referring to FIGS. 18 and 19, the camera module 500 and/or the electronic device 400 (e.g., the processor 120 of FIG. 1) may generate an electric field using the second coil 535*b* by applying an electrical signal to the second coil 535*b*, and an electromagnetic force generated between the second coil 535*b* and the second magnet 547 may act as a driving force to rotate the second rotating unit 504 around the second rotation axis A2 (e.g., the first guide ball 539*a* of FIG. 13). For example, as an electrical signal is applied to the second coil 535*b*, an inclination angle of the holding plate 541 or the first optical member 545 with respect to the first rotation axis A1 may be adjusted. As described before, the second coil 535*b* or the second magnet 547 may be provided with an electromagnetically shielded environment with respect to the first magnet 523 by the second yoke 537, while maintaining a substantially constant distance from the first magnet 523. For example, the rotational motion of the first rotating unit 503 or the rotational motion of the second rotating unit 504 may not interfere with each other, and thus control of the rotational or tilting motion of the first optical member 545 may be facilitated.

Figure 20:
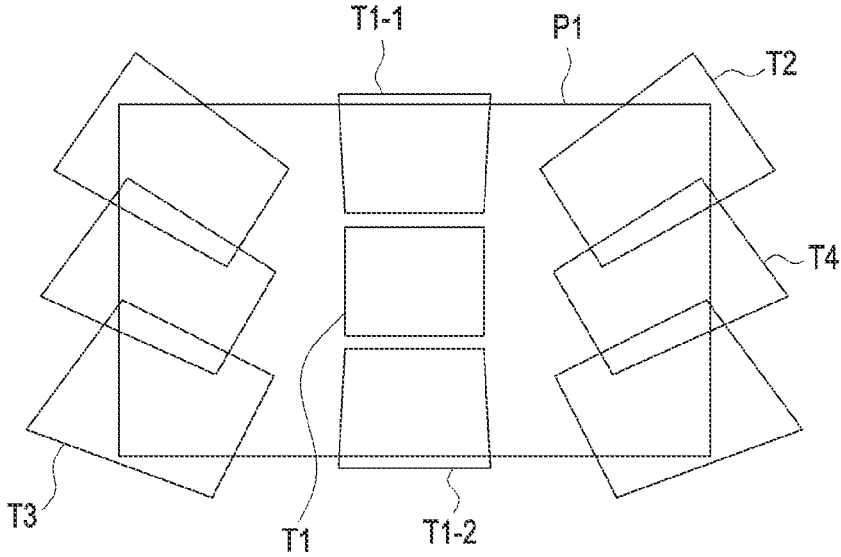
FIG. 20 is a diagram illustrating scanning areas of camera modules in an electronic device according to various embodiments.

FIG. 20 is a diagram illustrating example scanning areas of camera modules in an electronic device (e.g., the electronic devices 101, 102, 104, 200, 300, and 400 of FIGS. 1 to 6) according to various embodiments.

In FIG. 20, a first area indicated by 'P1' is an example area of an image obtained through a first camera module (e.g., a wide-angle camera or an ultra-wide-angle camera), and area(s) indicated by "Tn" or "Tn-x" is an example area(s) of an image obtained through the second camera module 500 (e.g., a telephoto camera, such as the camera module 405 or 500 in any one of the example embodiments of FIGS. 6 to 19). In an embodiment, depending on a scanning operation (e.g., the rotational or tilting motion described above), areas of the image obtained through the second camera module 500 may be located within the first area P1 on the whole, and the second camera module 500 may partially obtain an image of a subject in an area outside of the first area P1. For example, the second camera module 500 may track the subject throughout the first area P1 or scan a portion of the first area P1.

According to various embodiments, the electronic device 400 (e.g., the processor 120 of FIG. 1) may be configured to obtain an image of the first area P1 using the first camera module and, while obtaining the image of the first area P1, track a subject within the first area P1 and/or scan a portion of the first area P1 using the second camera module 500. For example, when photographing an image of the first area P1 using the first camera module, the electronic device 400 may photograph an image of a distant subject within the first area P1 using the second camera module 500 (e.g., a telephoto camera) and synthesize the image with the image obtained from the first camera module. Thus, even if there is a relative distance difference between subjects within the first area P1, the electronic device 400 may obtain a clear image of the subjects.

According to various embodiments, the first camera module may have a field of view of approximately 85 degrees with some variation depending on specifications, when it is a commercially available wide-angle camera, and a field of view of approximately 17 degrees, when the second camera module 500 is capable of 5× optical zoom. For example, the movable angular range (e.g., the movable angle range θ in FIG. 16) of the first rotating unit 503 with respect to the first guide unit 502 may be approximately 60 degrees (e.g., ±30 degrees with respect to a T1 area). For example, the second camera module 500 may scan substantially the entirety of the first area P1 in the horizontal direction of the first area P1. In an embodiment, at an initial position of the first optical member 545, the second camera module 500 may track or scan a subject in a central portion of the first area P1, such as the T1 area. A T1-1 area and a T1-2 area are example areas that are tracked or scanned while a tilting motion is made with respect to the second rotation axis A2 without a rotational motion around the first rotation axis A1. The T1-1 area may be scanned in a tilted state by an angle of approximately +8 degrees from the initial position, and the T1-2 area may be scanned in a tilted state by an angle of approximately –8 degrees from the initial position.

According to various embodiments, a T2 area may be an area scanned with the first optical member 545 rotated by an angle of approximately –32 degrees and tilted by an angle of approximately –2 degrees from the initial position, and a T3 area may be an area scanned with the first optical member 545 rotated by an angle of approximately 22 degrees and tilted by an angle of approximately –13 degrees. A T4 area may be, for example, an area scanned with the first optical member 545 rotated by an angle of approximately –27 degrees and tilted by an angle of approximately –7 degrees. Areas which are not indicated by reference numerals in FIG. 20 are illustrative of areas that are substantially symmetrical to the T2, T3, and T4 areas, and rotation or tilting angles at which the areas are scanned may be readily understood from the examples of the T2, T3, and T4 areas.

While an area of an image obtained at an initial position is illustrated by way of example as 'T1' in this embodiment, it is to be noted that various embodiments of the disclosure are not limited thereto. For example, any one of the areas indicated by 'Tn' or 'Tn-x' or other areas not given reference numbers may be set as the area of the image obtained at the initial position, which may be selected appropriately by initial settings of the electronic device 400 or the processor 120 or by user settings.

According to various embodiments, when the rotation angular range of the first rotating unit 503 is approximately 60 degrees, the first magnet 523 may include an arc section (hereinafter, referred to as a 'first arc section') corresponding to a moved section of the first coil 535*a* and an arc section (hereinafter, referred to as a 'second arc section') corresponding to a moved section of the second coil 535*b*. According to an embodiment, depending on relative positions of the first coil 535*a* and the second coil 535*b*, the first arc section and the second arc section may partially overlap or may be spaced apart from each other. For example, when the first and second arc sections partially overlap, an angular range in which the first magnet 523 is extended may be smaller than 120 degrees, and when the first and second arc sections are spaced apart from each other, the angular range in which the first magnet 523 is extended may be larger than 120 degrees. In an embodiment, when the first and second arc sections are spaced apart, a plurality of first magnets 523 may be arranged along an arc trajectory. While this embodiment numerically illustrates an angular range in which the first magnet 523 is extended or a rotation range of the first rotating unit 503, it is to be noted that various embodiments are not limited thereto. For example, while the angular range is described based on the rotation or movement angles and relative positions of the first coil 535*a* and the second coil 535*b*, the widths or lengths of the first coil 535*a* and the second coil 535*b* in a direction of movement or rotation may be further considered in determining the angle at which the first magnet 523 is extended. In an embodiment, the field of view of the first camera module (e.g., a wide-angle camera) may differ from that in the illustrated embodiment, in which case the rotation angular range of the first rotating unit 503 or the angular range of the first magnet 523 may be designed to be suitable for specifications required for a product.

According to various embodiments, the first rotating unit 503 may be rotatably disposed on the first guide unit 502 by the fixed magnet 527*a* and the first yoke 527*b*. For example, the arrangement structure of the first rotating unit 503 may be simplified, while a stable rotational structure may be realized. In an embodiment, the second yoke 537 may be disposed between the first magnet 523 and the second coil 535*b* to provide an electromagnetic shielding or isolation environment, thereby suppressing the occurrence of electromagnetic crosstalk even though the second yoke 537 is disposed close to the first magnet 523. For example, even though drive structures (e.g., the first magnet 523 and the first coil 535*a*) for the rotational motion of the first optical member 545 and drive structures (e.g., the second magnet 547 and the second coil 535*b*) for tilting of the first optical member 545 are disposed close to each other, control of a rotational and tilting motion may be facilitated. In an embodiment, the ease of disposing the drive structures for a rotational or tilting motion close to each other may allow the camera module 500 to be miniaturized and facilitate arrangement of the folded structure of the camera module 500 in a narrow internal space of the electronic device.

According to various example embodiments, a camera module (e.g., the camera module 405 or 500 of FIG. 6 or 7) and/or an electronic device (e.g., the electronic devices 101, 102, 104, 200, 300, and 400 of FIGS. 1 to 6) including the same may include: a first guide unit (e.g., the first guide unit 502 of FIG. 7 or 14) including a first magnet (e.g., the first magnet 523 of FIG. 7 or 14) having an arc shape centered on a first rotation axis (e.g., the first rotation axis A1 of FIG. 14), a first rotating unit (e.g., the first rotating unit 503 of FIG. 7 or 14) including a rotating base disposed on the first guide unit and configured to rotate around the first rotation axis, a support bearing (e.g., the support bearing 525 of FIG. 7 or 8) disposed between the first guide unit and the first rotating unit and configured to rotatably support the first rotating unit with respect to the first guide unit, a first coil (e.g., the first coil 535*a* of FIG. 7 or 14) disposed on the first rotating unit and configured to provide a driving force to rotate the first rotating unit by receiving an electrical signal and generating an electromagnetic force together with the first magnet, a fixed magnet (e.g., the fixed magnet 527*a* of FIG. 7 or 8) disposed on any one of the first guide unit and the first rotating unit, and a first yoke (e.g., the first yoke 527*b* of FIG. 7 or 14) disposed on the other of the first guide unit and the first rotating unit. The first rotating unit may be configured to rotate in close contact with the support bearing by a magnetic force generated between the fixed magnet and the first yoke, and the first coil may be configured to, as the first rotating unit rotates, move along an arc trajectory on the first magnet.

According to various example embodiments, the fixed magnet may be disposed within an area surrounded by the support bearing, and the first magnet may be disposed to surround at least a portion of a periphery of the support bearing.

According to various example embodiments, the first rotating unit may include a ring-shaped rotation base (e.g., the rotation base 531 of FIG. 7 or 14) aligned and configured to rotate around the first rotation axis and supported by the support bearing, a first coil bracket (e.g., the first coil bracket 531*a* of FIG. 9) formed on the rotation base, and a second guide unit (e.g., the second guide unit 533 of FIG. 9) extending from the rotation base in a direction intersecting the first rotation axis and including a second coil bracket (e.g., the second coil bracket 533*b* of FIG. 9) provided at an end thereof. The first coil may be mounted on the first coil bracket and disposed to at least partially face the first magnet.

According to various example embodiments, the camera module and/or the electronic device may further include: a flexible printed circuit board (FPCB) (e.g., the FPCB 551 of FIG. 14) disposed on the first guide unit and connected to the first rotating unit. The FPCB may include a first section (e.g., the first section 551*a* of FIG. 14) disposed on the first guide unit along an arc trajectory centered on the first rotation axis, and a second section (e.g., the second section 551*b* of FIG. 14) bent from the first section and disposed along an arc trajectory, at least partially facing the first section, and the second section may be connected to the first rotating unit.

According to various example embodiments, the first guide unit may further include an arc-shaped guide frame (e.g., the guide frame 529 of FIG. 7 or 8) disposed to at least partially face the first magnet, and the first section may be disposed on the guide frame.

According to various example embodiments, the camera module and/or the electronic device including the same may further include: a second rotating unit (e.g., the second rotating unit 504 of FIG. 7 or 14) including a plate disposed on the first rotating unit and configured to rotate together with the first rotating unit around the first rotation axis and rotate around a second rotation axis (e.g., the second rotation axis A2 of FIG. 14) intersecting the first rotation axis with respect to the first rotating unit, a second coil (e.g., the second coil 535*b* of FIG. 7 or 9) disposed on the second coil bracket, and a second magnet (e.g., the second magnet 547 of FIG. 7 or 13) disposed on the second rotating unit and at least partially facing the second coil in a direction of the second rotation axis, wherein the second coil may be configured to provide a driving force to rotate the second rotating unit with respect to the first rotating unit by receiving an electrical signal and generating an electromagnetic force together with the second magnet.

According to various example embodiments, the second rotating unit may include a holding plate (e.g., the holding plate 541 of FIG. 7 or 14) disposed on the first rotation axis and disposed to be inclined with respect to the first rotation axis, and a magnet bracket (e.g., the magnet bracket 543 of FIG. 7 or 14) provided on one side of the holding plate and disposed to at least partially face the second coil bracket in the direction of the second rotation axis, and the second magnet may be disposed on the magnet bracket, at least partially facing the second coil.

According to various example embodiments, the first rotating unit may further include a second yoke (e.g., the second yoke 537 of FIG. 7) disposed on the second coil bracket, and the second yoke may be configured to generate a magnetic force acting in a direction of bringing the magnet bracket into close contact with the second coil bracket by being disposed to correspond to the second magnet.

According to various example embodiments, the camera module and/or the electronic device including the same may further include a plurality of guide balls (e.g., the guide balls 539*a* and 539*b* of FIG. 9 or 13) disposed between the second coil bracket and the magnet bracket, and the second rotating unit may be configured to rotate around the second rotation axis with respect to the first rotating unit, while being guided by the guide balls.

According to various example embodiments, any one of the guide balls may be disposed on the second rotation axis (see FIG. 9 or 10).

According to various example embodiments, the camera module and/or the electronic device including the same may include: a first optical member (e.g., the first optical member 455 or 545 of FIG. 6, 7 or 14) comprising a reflective surface configured to rotate around at least one of the first rotation axis or the second rotation axis by being disposed on the holding plate, a second optical member comprising a lens (e.g., the second optical member 453 of FIG. 6) aligned with the first optical member in a direction intersecting the first rotation axis or the second rotation axis, and an image sensor (e.g., the image sensor 451 of FIG. 6 or 7) disposed in alignment with an optical axis (e.g., the optical axis O of FIG. 6) of the second optical member. The image sensor may be configured to receive external light through the first optical member and the second optical member.

According to various example embodiments, the first optical member may be configured to allow external light incident from a first direction (e.g., the first incident direction L1 of FIG. 6) to be incident on the second optical member by reflecting or refracting the external light in a second direction (e.g., the second incident direction L2 of FIG. 6) intersecting the first direction.

According to various example embodiments, a camera module (e.g., the camera module 405 or 500 of FIG. 6 or 7) and/or an electronic device (e.g., the electronic devices 101, 102, 104, 200, 300, and 400 of FIGS. 1 to 6) including the same may include: a first guide unit (e.g., the first guide unit 502 of FIG. 7 or 14) including a first magnet (e.g., the first magnet 523 of FIG. 7 or 14) having an arc shape centered on a first rotation axis (e.g., the first rotation axis A1 of FIG. 14), a first rotating unit including a base (e.g., the first rotating unit 503 of FIG. 7 or 14) disposed on the first guide unit and configured to rotate around the first rotation axis, a first coil (e.g., the first coil 535*a* of FIG. 7 or 14) disposed on the first rotating unit and configured to provide a driving force to rotate the first rotating unit by receiving an electrical signal and generating an electromagnetic force together with the first magnet, a second rotating unit including a plate (e.g., the second rotating unit 504 of FIG. 7 or 14) disposed on the first rotating unit and configured to rotate together with the first rotating unit around the first rotation axis and rotate around a second rotation axis (e.g., the second rotation axis A2 of FIG. 14) intersecting the first rotation axis with respect to the first rotating unit, a second coil (e.g., the second coil 535*b* of FIG. 7 or 9) disposed on the first rotating unit at a specified spacing from the first coil, and a second magnet (e.g., the second magnet 547 of FIG. 7 or 13) disposed on the second rotating unit and at least partially facing the second coil in a direction of the second rotation axis. The second coil may be configured to generate a driving force to rotate the second rotating unit with respect to the first rotating unit by receiving an electrical signal and generating an electromagnetic force together with the second magnet. The first coil may be configured to, as the first rotating unit rotates, move along an arc trajectory within a range in which the first magnet is located.

According to various example embodiments, the camera module and/or the electronic device including the same may include: a support bearing (e.g., the support bearing 525 of FIG. 7 or 8) disposed between the first guide unit and the first rotating unit and configured to rotatably support the first rotating unit with respect to the first guide unit, a fixed magnet (e.g., the fixed magnet 527*a* of FIG. 7 or 8) disposed on the first guide unit, and a first yoke (e.g., the first yoke 527*b* of FIG. 7 or 14) disposed on the first rotating unit. The first rotating unit may be configured to rotate in close contact with the support bearing by a magnetic force generated between the fixed magnet and the first yoke.

According to various example embodiments, the camera module and/or the electronic device including the same may include: a first optical member (e.g., the first optical member 455 or 545 of FIG. 6, 7 or 14) comprising a reflective surface configured to rotate around at least one of the first rotation axis or the second rotation axis by being disposed on the second rotating unit, a second optical member comprising a lens (e.g., the second optical member 453 of FIG. 6) aligned with the first optical member in a direction intersecting the first rotation axis or the second rotation axis, and an image sensor (e.g., the image sensor 451 of FIG. 6 or 7) disposed in alignment with an optical axis of the second optical member. The image sensor may be configured to receive external light through the first optical member and the second optical member.

According to various example embodiments, the first optical member may be configured to allow external light incident from a first direction (e.g., the first incident direction L1 of FIG. 6) to be incident on the second optical member by reflecting or refracting the external light in a second direction (e.g., the second incident direction L2 of FIG. 6) intersecting the first direction.

According to various example embodiments, the first rotating unit may include a ring-shaped rotation base (e.g., the rotation base 531 of FIG. 7 or 14) disposed to rotate around the first rotation axis, a first coil bracket (e.g., the first coil bracket 531*a* of FIG. 9) formed on the rotation base, and a second guide unit (e.g., the second guide unit 533 of FIG. 9) extending from the rotation base in the direction intersecting the first rotation axis and including a second coil bracket (e.g., the second coil bracket 533*b* of FIG. 9) provided at an end thereof. The first coil may be mounted on the first coil bracket and disposed to at least partially face the first magnet, and the second coil may be disposed on the second coil bracket.

According to various example embodiments, the camera module and/or the electronic device may further include a flexible printed circuit board (FPCB) (e.g., the FPCB 551 of FIG. 14) disposed on the first guide unit. The FPCB may include a first section (e.g., the first section 551*a* of FIG. 14) disposed along an arc trajectory on the first guide unit, a second section (e.g., the second section 551*b* of FIG. 14) connected to the first rotating unit and disposed to at least partially face the first section on the first guide unit, and a connecting section (e.g., the connecting section 551*c* of FIG. 14) connecting the first section and the second section.

According to various example embodiments, the camera module and/or the electronic device including the same may further include: a second yoke (e.g., the second yoke 537 of FIG. 7) disposed on the first rotating unit. The second yoke may be configured to generate a magnetic force acting in a direction that brings the second rotating unit into close contact with the first rotating unit in a direction of the second rotation axis by being disposed to correspond to the second magnet.

According to various example embodiments, an electronic device (e.g., the electronic devices 101, 102, 104, 200, 300, and 400 of FIGS. 1 to 6) may include: a first camera module including a camera (e.g., the camera modules 180, 205, 212, and 213 of FIGS. 1 to 3), a second camera module including a camera (e.g., a telephoto camera or a scan camera as the camera module 405 or 500 of FIG. 6 or 7) according to the foregoing embodiment, and at least one processor, comprising processing circuitry, individually and/or collectively (e.g., the processor 120 of FIG. 1 configured to: obtain a first image (e.g., an image of the first area P1 in FIG. 20) using the first camera module, and to track a subject in the first image or scan a partial area (e.g., the area(s) indicated by 'Tn' or 'Tn-x' in FIG. 20) in the first image using the second camera module, while obtaining the first image.

While various example embodiments have been illustrated described in the disclosure, it will be understood that the various example embodiments are intended to be illustrative, not limiting. It will be further understood by those skilled in the art that many modifications can be made without departing from the scope of the disclosure, including the appended claims and their equivalents. It will also be understood that any of the embodiment(s) described herein may be used in conjunction with any other embodiment(s) described herein.

What is claimed is:

1. A camera module comprising:
   a first guide unit including a first magnet having an arc shape centered on a first rotation axis;
   a first rotating unit comprising a rotation base disposed on the first guide unit and configured to rotate around the first rotation axis;
   a support bearing disposed between the first guide unit and the first rotating unit and configured to rotatably support the first rotating unit with respect to the first guide unit;
   a first coil disposed on the first rotating unit and configured to provide a driving force to rotate the first rotating unit by receiving an electrical signal and generating an electromagnetic force together with the first magnet;
   a fixed magnet disposed on any one of the first guide unit and the first rotating unit; and
   a first yoke disposed on an other of the first guide unit and the first rotating unit,
   wherein the first rotating unit is configured to rotate in close contact with the support bearing by a magnetic force generated between the fixed magnet and the first yoke, and
   wherein the first coil is configured to, as the first rotating unit rotates, move along an arc trajectory on the first magnet.

2. The camera module of claim 1, wherein the fixed magnet is disposed within an area surrounded by the support bearing, and
   wherein the first magnet is disposed to surround at least a portion of a periphery of the support bearing.

3. The camera module of claim 1, wherein the first rotating unit includes:
   a ring-shaped rotation base aligned to rotate around the first rotation axis and supported by the support bearing;
   a first coil bracket formed on the rotation base; and
   a second guide unit extending from the rotation base in a direction intersecting the first rotation axis and including a second coil bracket provided at an end thereof, and
   wherein the first coil is mounted on the first coil bracket and disposed to at least partially face the first magnet.

4. The camera module of claim 3, further comprising a flexible printed circuit board disposed on the first guide unit and connected to the first rotating unit,
   wherein the flexible printed circuit board includes a first section disposed on the first guide unit along an arc trajectory centered on the first rotation axis, and a second section bent from the first section and disposed along an arc trajectory, at least partially facing the first section, and wherein the second section is connected to the first rotating unit.

5. The camera module of claim 4, wherein the first guide unit further includes an arc-shaped guide frame disposed to at least partially face the first magnet, and wherein the first section is disposed on the guide frame.

6. The camera module of claim 3, further comprising:

a second rotating unit comprising a plate disposed on the first rotating unit and configured to rotate together with the first rotating unit around the first rotation axis and rotate around a second rotation axis intersecting the first rotation axis with respect to the first rotating unit;

a second coil disposed on the second coil bracket; and a second magnet disposed on the second rotating unit and at least partially facing the second coil in a direction of the second rotation axis, wherein the second coil is configured to provide a driving force to rotate the second rotating unit with respect to the first rotating unit by receiving an electrical signal and generating an electromagnetic force together with the second magnet.

7. The camera module of claim 6, wherein the second rotating unit includes:

a holding plate disposed on the first rotation axis and disposed to be inclined with respect to the first rotation axis; and a magnet bracket provided on one side of the holding plate and disposed to at least partially face the second coil bracket in the direction of the second rotation axis, and wherein the second magnet is disposed on the magnet bracket, at least partially facing the second coil.

8. The camera module of claim 7, wherein the first rotating unit further includes a second yoke disposed on the second coil bracket, and wherein the second yoke is configured to generate a magnetic force acting in a direction of bringing the magnet bracket into close contact with the second coil bracket by being disposed to correspond to the second magnet.

9. The camera module of claim 7, further comprising a plurality of guide balls disposed between the second coil bracket and the magnet bracket, wherein the second rotating unit is configured to rotate around the second rotation axis with respect to the first rotating unit, while being guided by the guide balls.

10. The camera module of claim 7, further comprising:

a first optical member comprising a reflective surface configured to rotate around at least one of the first rotation axis or the second rotation axis by being disposed on the holding plate;

a second optical member comprising a lens aligned with the first optical member in a direction intersecting the first rotation axis or the second rotation axis; and an image sensor disposed in alignment with an optical axis of the second optical member, wherein the image sensor is configured to receive external light through the first optical member and the second optical member.

11. An electronic device comprising:

a first camera module including a camera;

a second camera module including a camera; and at least one processor, comprising processing circuitry, individually and/or collectively configured to: obtain a first image using the first camera module, and track a subject in the first image or scan a partial area in the first image using the second camera module, while obtaining the first image, wherein the second camera module includes:

a first guide unit including a first magnet having an arc shape centered on a first rotation axis;

a first rotating unit comprising a rotation base disposed on the first guide unit and configured to rotate around the first rotation axis;

a first coil disposed on the first rotating unit and configured to provide a driving force to rotate the first rotating unit by receiving an electrical signal and generating an electromagnetic force together with the first magnet;

a second rotating unit comprising a plate disposed on the first rotating unit and configured to rotate together with the first rotating unit around the first rotation axis and rotate around a second rotation axis intersecting the first rotation axis with respect to the first rotating unit;

a second coil disposed on the first rotating unit at a specified spacing from the first coil; and a second magnet disposed on the second rotating unit and at least partially facing the second coil in a direction of the second rotation axis, wherein the second coil is configured to provide a driving force to rotate the second rotating unit with respect to the first rotating unit by receiving an electrical signal and generating an electromagnetic force together with the second magnet, and wherein the first coil is configured to, as the first rotating portion rotates, move along an arc trajectory within a range in which the first magnet is disposed.

12. The electronic device of claim 11, further comprising:

a support bearing disposed between the first guide unit and the first rotating unit and configured to rotatably support the first rotating unit with respect to the first guide unit;

a fixed magnet disposed on the first guide unit; and a first yoke disposed on the first rotating unit, wherein the first rotating unit is configured to rotate in close contact with the support bearing by a magnetic force generated between the fixed magnet and the first yoke.

13. The electronic device of claim 11, further comprising:

a first optical member comprising a reflective surface configured to rotate around at least one of the first rotation axis or the second rotation axis by being disposed on the second rotating unit;

a second optical member comprising a lens aligned with the first optical member in a direction intersecting the first rotation axis or the second rotation axis; and an image sensor disposed in alignment with an optical axis of the second optical member, wherein the image sensor is configured to receive external light through the first optical member and the second optical member.

14. The electronic device of claim 11, wherein the first rotating unit includes:

a ring-shaped rotation base disposed to rotate around the first rotation axis;

a first coil bracket formed on the rotation base; and a second guide unit extending from the rotation base in a direction intersecting the first rotation axis, and including a second coil bracket provided at an end of the second guide unit, wherein the first coil is mounted on the first coil bracket and disposed to at least partially face the first magnet, and wherein the second coil is disposed on the second coil bracket.

15. The electronic device of claim 11, further comprising a second yoke disposed on the first rotating unit, wherein the second yoke is configured to generate a magnetic force acting in a direction that brings the second rotating unit into close contact with the first rotating unit in a direction of the second rotation axis by being disposed to correspond to the second magnet.

\* \* \* \* \*